(12) United States Patent
Vassilieva et al.

(10) Patent No.: US 10,700,807 B1
(45) Date of Patent: Jun. 30, 2020

(54) FIBER INPUT POWER SELECTION FOR PROBABILISTICALLY SHAPED SIGNALS IN OPTICAL NETWORKS

(71) Applicant: Fujitsu Limited, Kawasaki-shi, Kanagawa (JP)

(72) Inventors: Olga I. Vassilieva, Plano, TX (US); Inwoong Kim, Allen, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 16/458,779

(22) Filed: Jul. 1, 2019

(51) Int. Cl.
*H04J 14/02* (2006.01)
*H04J 14/06* (2006.01)
*H04B 10/079* (2013.01)
*H04J 14/08* (2006.01)
*H04B 10/548* (2013.01)

(52) U.S. Cl.
CPC .... *H04J 14/0221* (2013.01); *H04B 10/07953* (2013.01); *H04B 10/548* (2013.01); *H04J 14/0267* (2013.01); *H04J 14/06* (2013.01); *H04J 14/083* (2013.01)

(58) Field of Classification Search
None
See application file for complete search history.

(56) References Cited

U.S. PATENT DOCUMENTS

| | | | |
|---|---|---|---|
| 9,673,907 B1 * | 6/2017 | Vassilieva | H04B 10/5161 |
| 9,929,813 B1 * | 3/2018 | Batshon | H04B 10/516 |
| 10,389,473 B1 * | 8/2019 | Vassilieva | H04B 10/25 |
| 2011/0142446 A1 * | 6/2011 | Lyubomirsky | H04J 14/0278 398/43 |
| 2012/0224851 A1 * | 9/2012 | Takara | H04B 10/0793 398/45 |
| 2016/0323039 A1 * | 11/2016 | Sun | H04B 10/5161 |
| 2018/0262274 A1 * | 9/2018 | Yu | H04B 10/548 |
| 2018/0269979 A1 * | 9/2018 | Zhang | H04B 10/5161 |
| 2019/0149239 A1 * | 5/2019 | Tehrani | H04B 10/541 398/183 |
| 2019/0149242 A1 * | 5/2019 | Torbatian | H04B 10/5161 398/185 |

* cited by examiner

*Primary Examiner* — David W Lambert
(74) *Attorney, Agent, or Firm* — Baker Botts L.L.P.

(57) ABSTRACT

Systems and methods for setting fiber input power for an optical transmission path may include determining an initial modulation format representing a uniform distribution QAM format, the initial modulation format associated with a first fiber input power and a first spectral efficiency, configuring optical transponders to apply probabilistic shaping to the initial modulation format when transmitting traffic over the optical transmission path, the traffic including probabilistically shaped signals with a second spectral efficiency, determining, dependent on the second spectral efficiency, a second fiber input power, and configuring optical amplifiers along the optical transmission path to transmit the traffic comprising the probabilistically shaped signals over the optical transmission path using the second fiber input power. Determining the second fiber input power may include incrementally increasing or decreasing an optimum fiber input power for a reference modulation format or applying an adaptive selection process to dynamically select the second fiber input power.

20 Claims, 13 Drawing Sheets

FIBER INPUT POWER SELECTION FOR PROBABILISTICALLY SHAPED SIGNALS IN OPTICAL NETWORKS

BACKGROUND

Field of the Disclosure

The present disclosure relates generally to optical communication networks and, more particularly, to probabilistic constellation shaping of modulation formats for optical communication systems and fiber input selection for probabilistically shaped signals.

Description of the Related Art

Telecommunications systems, cable television systems and data communication networks use optical networks to rapidly convey large amounts of information between remote points. In an optical network, information is conveyed in the form of optical signals through optical fibers. Optical networks may also include various network nodes such as amplifiers, dispersion compensators, multiplexer/demultiplexer filters, wavelength selective switches, couplers, etc. to perform various operations within the network.

Optical superchannels are an emerging solution for transmission of optical signals at 400 Gb/s and 1 Tb/s data rate per channel, and hold promise for even higher data rates in the future. A typical superchannel includes a set of subcarriers that are frequency multiplexed to form a single wavelength channel. The superchannel may then be transmitted through an optical network as a single channel across network endpoints. The subcarriers within the superchannel are tightly packed to achieve high spectral efficiency, enabling superchannels to achieve an increase in data capacity. However, the reach of optical signals, even when using superchannels, may still be limited by optical signal-to-noise ratio (OSNR) levels experienced during transmission.

SUMMARY

In one aspect, a method for setting fiber input power in an optical transport network includes determining, dependent on a target distance for an optical transmission path in the optical transport network, an initial modulation format for the optical transmission path, the initial modulation format representing a uniform distribution quadrature amplitude modulation (QAM) format selected from among a plurality of QAM modulation formats supported in the optical transport network, and the initial modulation format being associated with a first fiber input power and a first spectral efficiency. The method also includes configuring one or more optical transponders to apply probabilistic shaping to the initial modulation format when transmitting traffic over the optical transmission path, the traffic including probabilistically shaped signals associated with a second spectral efficiency, determining, dependent on the second spectral efficiency, a second fiber input power different from the first fiber input power, and configuring one or more optical amplifiers along the optical transmission path to transmit the traffic including the probabilistically shaped signals over the optical transmission path using the second fiber input power.

In any of the disclosed embodiments, the first fiber input power may be dependent on one or more of a measure of fiber nonlinearity in the optical transmission path and a link configuration along the optical transmission path.

In any of the disclosed embodiments, determining the second fiber input power may include determining a first difference between the second spectral efficiency and a third spectral efficiency associated with a first reference modulation format, the third spectral efficiency being less than the second spectral efficiency, and the first reference modulation format being a uniform distribution QAM modulation format associated with a third fiber input power, determining a second difference between the second spectral efficiency and a fourth spectral efficiency associated with a second reference modulation format, the fourth spectral efficiency being greater than the second spectral efficiency, the second reference modulation format being a next higher order uniform distribution QAM modulation format than the first reference modulation format, and the second reference modulation format being associated with a fourth fiber input power, determining that the first difference is less than the second difference, and in response to determining that the first difference is less than the second difference, determining the second fiber input power by reducing the third fiber input power by an amount dependent on the difference between the third fiber input power and the fourth fiber input power.

In any of the disclosed embodiments, determining the second fiber input power may include determining a first difference between the second spectral efficiency and a third spectral efficiency associated with a first reference modulation format, the third spectral efficiency being less than the second spectral efficiency, and the first reference modulation format being a uniform distribution QAM modulation format associated with a third fiber input power, determining a second difference between the second spectral efficiency and a fourth spectral efficiency associated with a second reference modulation format, the fourth spectral efficiency being greater than the second spectral efficiency, the second reference modulation format being a next higher order uniform distribution QAM modulation format than the first reference modulation format, and the second reference modulation format being associated with a fourth fiber input power, determining that the first difference is greater than the second difference, and in response to determining that the first difference is greater than the second difference, setting the second fiber input power to an amount equal to the fourth fiber input power.

In any of the disclosed embodiments, configuring the one or more optical transponders to apply probabilistic shaping to the initial modulation format may include determining, dependent on the initial modulation format, a maximum signal-to-noise ratio (SNR) for the optical transmission path and a corresponding fiber input power associated with the maximum SNR, determining, dependent on the maximum SNR, a maximum achievable information rate (AIR) and a corresponding shaping factor to be applied to the initial modulation format, determining an entropy for the probabilistic shaping dependent on the maximum AIR and the corresponding shaping factor, the entropy being indicative of the second spectral efficiency, and configuring the one or more optical transponders to apply probabilistic shaping to the initial modulation format in accordance with the determined entropy.

In any of the disclosed embodiments, determining the second fiber input power may include monitoring SNR performance of the optical transmission path, and calculating the second fiber input power dependent on the monitoring.

In any of the disclosed embodiments, determining the second fiber input power may include calculating, using an enhanced Gaussian noise model, the second fiber input power dependent on the maximum SNR.

In any of the disclosed embodiments, determining the second fiber input power may include modifying kurtosis of a probability distribution associated with the shaping factor, and adjusting fiber input power dependent on increased tolerance to fiber nonlinearity caused by modifying the probability distribution.

In any of the disclosed embodiments, determining the maximum SNR may include computing the maximum SNR using an enhanced Gaussian noise model.

In any of the disclosed embodiments, the method may further include repeating said determining a maximum SNR to determine a modified maximum SNR, repeating said determining a maximum AIR and a corresponding shaping factor to determine a modified maximum AIR and a modified shaping factor, repeating said determining an entropy to determine a modified entropy, the modified entropy being indicative of a modified spectral efficiency, determining a third fiber input power for the probabilistically shaped signals dependent on the modified spectral efficiency, and configuring the one or more optical amplifiers along the optical transmission path to transmit the traffic including the probabilistically shaped signals over the optical transmission path using the second fiber input power.

In any of the disclosed embodiments, determining the second fiber input power may include selecting, dependent on an SNR margin for the optical transport network, a process for determining the second fiber input power from among a plurality of processes for determining the second fiber input power, the plurality of processes including a coarse method for estimating an optimum fiber input power in which an optimum fiber input power for a reference modulation format is incrementally increased or decreased dependent on the second spectral efficiency, and an adaptive process in which selection of the second fiber input power is dependent on measured performance, enhanced Gaussian nose modeling, or modification of a shaping distribution associated with the probabilistically shaped signals.

In another aspect, an optical transport network for constellation shaping of quadrature amplitude modulation (QAM) formats includes an optical transmission path, a plurality of transponders, each operable to apply probabilistic shaping to QAM modulation formats, one or more optical amplifiers along the optical transmission path, and a network management system. The network management system is configured to determine, dependent on a target distance for the optical transmission path, an initial modulation format for the optical transmission path, the initial modulation format representing a uniform distribution QAM modulation format selected from among a plurality of QAM modulation formats supported in the optical transport network, and the initial modulation format being associated with a first fiber input power and a first spectral efficiency. The network management system is further configured to configure the one or more optical transponders to apply probabilistic shaping to the initial modulation format when transmitting traffic over the optical transmission path, the traffic including probabilistically shaped signals associated with a second spectral efficiency, determine, dependent on the second spectral efficiency, a second fiber input power different from the first fiber input power, and configure the one or more optical amplifiers along the optical transmission path to transmit the traffic including the probabilistically shaped signals over the optical transmission path using the second fiber input power.

In any of the disclosed embodiments, the first fiber input power may be dependent on one or more of a measure of fiber nonlinearity in the optical transmission path and a link configuration along the optical transmission path.

In any of the disclosed embodiments, to determine the second fiber input power, the network management system may be configured to determine a first difference between the second spectral efficiency and a third spectral efficiency associated with a first reference modulation format, the third spectral efficiency being less than the second spectral efficiency, and the first reference modulation format being a uniform distribution QAM modulation format associated with a third fiber input power, determine a second difference between the second spectral efficiency and a fourth spectral efficiency associated with a second reference modulation format, the fourth spectral efficiency being greater than the second spectral efficiency, the second reference modulation format being a next higher order uniform distribution QAM modulation format than the first reference modulation format, and the second reference modulation format being associated with a fourth fiber input power, determine whether the first difference is less than the second difference, in response to a determination that the first difference is less than the second difference, determine the second fiber input power by reducing the third fiber input power by an amount dependent on the difference between the third fiber input power and the fourth fiber input power, and in response to a determination that that the first difference is not less than the second difference, set the second fiber input power to an amount equal to the fourth fiber input power.

In any of the disclosed embodiments, to configure the one or more optical transponders to apply probabilistic shaping to the initial modulation format, the network management system may be configured to determine, dependent on the initial modulation format, a maximum signal-to-noise ratio (SNR) for the optical transmission path and a corresponding fiber input power associated with the maximum SNR, determine, dependent on the maximum SNR, a maximum achievable information rate (AIR) and a corresponding shaping factor to be applied to the initial modulation format, determine an entropy for the probabilistic shaping dependent on the maximum AIR and the corresponding shaping factor, the entropy being indicative of the second spectral efficiency, and configure the one or more optical transponders to apply probabilistic shaping to the initial modulation format in accordance with the determined entropy.

In any of the disclosed embodiments, to determine the second fiber input power, the network management system may be configured to monitor SNR performance of the optical transmission path and calculate the second fiber input power dependent on the monitoring.

In any of the disclosed embodiments, to determine the second fiber input power, the network management system may be configured to calculate, using an enhanced Gaussian noise model, the second fiber input power dependent on the maximum SNR.

In any of the disclosed embodiments, to determine the second fiber input power, the network management system may be configured to modify kurtosis of a probability distribution associated with the shaping factor and adjust fiber input power dependent on increased tolerance to fiber nonlinearity caused by modification of the probability distribution.

In any of the disclosed embodiments, to determine the maximum SNR, the network management system may be configured to compute the maximum SNR using an enhanced Gaussian noise model.

In any of the disclosed embodiments, the network management system may be further configured to determine a modified maximum SNR for the optical transmission path, determine a modified maximum AIR and a modified shaping factor for the optical transmission path, determine a modified entropy for the optical transmission path, the modified entropy being indicative of a modified spectral efficiency for the probabilistically shaped signals, determine a third fiber input power for the probabilistically shaped signals dependent on the modified spectral efficiency, and configure the one or more optical amplifiers along the optical transmission path to transmit the traffic including the probabilistically shaped signals over the optical transmission path using the third fiber input power.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Figure 1A:
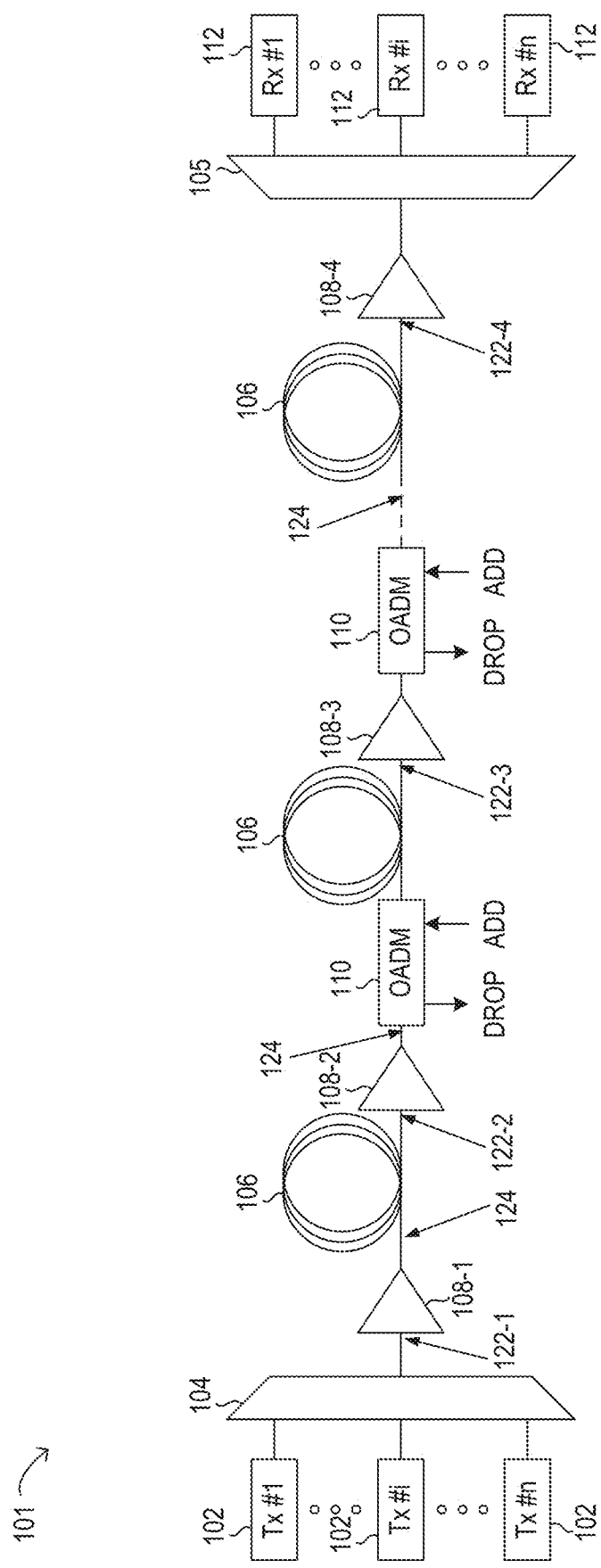
FIG. 1A is a block diagram of selected elements of an embodiment of an optical transport network.

Referring now to the drawings, FIG. 1A illustrates an example embodiment of optical transport network (OTN) 101, which may represent an optical communication system. Optical transport network 101 includes one or more optical fibers 106 to transport one or more optical signals communicated by components of optical transport network 101. The network elements of optical transport network 101, coupled together by fibers 106, may comprise one or more transmitters (Tx) 102, one or more multiplexers (MUX) 104, one or more optical amplifiers 108, one or more optical add/drop multiplexers (OADM) 110, one or more demultiplexers (DEMUX) 105, and one or more receivers (Rx) 112.

Optical transport network 101 may comprise a point-to-point optical network with terminal nodes, a ring optical network, a mesh optical network, or any other suitable optical network or combination of optical networks. Optical transport network 101 may be used in a short-haul metropolitan network, a long-haul inter-city network, or any other suitable network or combination of networks. The capacity of optical transport network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a standard Single-Mode Fiber (SMF), Enhanced Large Effective Area Fiber (E-LEAF), Ultra-Large Effective Area Fiber (U-LEAF), or TrueWave® Reduced Slope (TW-RS) fiber, among others.

Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a "channel" that is included in an optical signal. Each channel may carry a certain amount of information through optical transport network 101.

To increase the information capacity and transport capabilities of optical transport network 101, multiple signals transmitted at multiple channels may be combined into a single wide bandwidth optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may transmit disparate channels using WDM or some other suitable multi-channel multiplexing technique, and to amplify the multi-channel signal.

Recently, advancements in DWDM enabled combining several optical carriers to create a composite optical signal of a desired capacity. One such example of a multi-carrier optical signal is a superchannel, which is an example of high spectral efficiency (SE) that may attain transmission rates of 100 Gb/s, 400 Gb/s, 1 Tb/s, or higher. Thus, in a superchannel, subcarriers are tightly packed and consume less optical spectrum than in conventional DWDM. Another distinctive feature of superchannels is that the subcarriers in a superchannel travel from the same origin to the same destination, and are not added or removed using an OADM while in transmission. Techniques for achieving high spectral efficiency (SE) in optical networks may include the use of superchannels modulated using dual-polarization quadrature phase-shift keying (DP-QPSK) for long-haul transmission at data rates of 100 Gb/s or greater. In particular embodiments, Nyquist wavelength-division multiplexing (N-WDM) may be used in a superchannel. In N-WDM, optical pulses having a nearly rectangular spectrum are packed together in the frequency domain with a bandwidth approaching the baud rate.

Optical transport network 101 may include one or more optical transmitters (Tx) 102 to transmit optical signals through optical transport network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical transport network 101. In some embodiments, optical transmitter 102 may be used to determine the baud rate for the data to be transmitted during the optical modulation. An example of transmitter 102 for applying different baud rates is an adaptive rate transponder. An example of transmitter 102 for applying different modulation formats is a universally programmable transceiver. Additionally, a forward error correction (FEC) module may be included in optical transmitter 102, or may be used in conjunction with optical transmitter 102. The FEC module may process the electrical signal carrying the information or data to be transmitted to include error correction codes. The FEC module at transmitter 102 may also determine a baud rate for sending the data to be transmitted to optical transmitter 102 for optical modulation.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before and after certain lengths of fiber 106, which is referred to as "in-line amplification". Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which is the portion of the optical fiber that increases the intensity of the optical signal. As an example, optical amplifiers 108 may comprise an erbium-doped fiber amplifier (EDFA). However, any other suitable amplifier, such as a semiconductor optical amplifier (SOA), may be used.

OADMs 110 may be coupled to optical transport network 101 via fibers 106. OADMs 110 comprise an add/drop module, which may include a system, apparatus or device to add and drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination. In this manner, OADMs 110 may enable connection of different optical transport network topologies together, such as different rings and different linear spans.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing, which is compatible with conventional implementations of optical add-drop multiplexers (OADMs) and with conventional implementations of demultiplexers 105. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, optical transport network 101 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in optical transport network 101, ROADM 110 may be capable of adding or dropping individual or multiple wavelengths of a WDM, DWDM, or superchannel signal carrying data channels to be added or dropped in the optical domain. In certain embodiments, ROADM 110 may include or be coupled to a wavelength selective switch (WS S).

As shown in FIG. 1A, optical transport network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical transport network 101 may transmit and carry a forty (40) channel DWDM signal. Demultiplexer 105 may divide the single, forty channel DWDM signal into forty separate signals according to the forty different channels. It will be understood that different numbers of channels or subcarriers may be transmitted and demultiplexed in optical transport network 101, in various embodiments.

In FIG. 1A, optical transport network 101 may also include receivers 112 coupled to demultiplexer 105. Each receiver 112 may receive optical signals transmitted at a particular wavelength or channel, and may process the optical signals to obtain (demodulate) the information (data) that the optical signals contain. Accordingly, network 101 may include at least one receiver 112 for every channel of the network. As shown, receivers 112 may demodulate the optical signals according to a baud rate used by transmitter 102. In some embodiments, receiver 112 may include, or may be followed by, a forward error correction (FEC) module to use the error correction codes to check the integrity of the received data. The FEC module may also correct certain errors in the data based on the error correction codes. The FEC module at receiver 112 may also demodulate the data at a specific baud rate defined for each channel at transmitter 102, as described above.

Optical networks, such as optical transport network 101 in FIG. 1A, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "MQAM."

Examples of PSK and QAM with a different number of symbols can include binary PSK (BPSK or 2-PSK) using two phases at 0° and 180° (or in radians, 0 and $\pi$) on the constellation diagram; or quadrature PSK (QPSK, 4-PSK, or 4QAM) using four phases at 0°, 90°, 180°, and 270° (or in radians, 0, $\pi/2$, $\pi$, and $3\pi/2$). Phases in such signals may be offset. Each of 2-PSK and 4-PSK signals may be arranged on the constellation diagram. Certain m-PSK signals may also be polarized using techniques such as dual-polarization QPSK (DP-QPSK), wherein separate m-PSK signals are multiplexed by orthogonally polarizing the signals. Also, MQAM signals may be polarized using techniques such as dual-polarization 16QAM (DP-16QAM), wherein separate MQAM signals are multiplexed by orthogonally polarizing the signals.

Dual polarization technology, which may also be referred to as polarization division multiplexing (PDM), enables achieving a greater bit rate for information transmission. PDM transmission comprises simultaneously modulating information onto various polarization components of an optical signal associated with a channel, thereby nominally increasing the transmission rate by a factor of the number of polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In certain embodiments, optical transport network 101 may transmit a superchannel, in which a plurality of subcarriers (or subchannels or channels) are densely packed in a fixed bandwidth band and may be transmitted at very high data rates, such as 400 Gb/s, 1 Tb/s, or higher. Furthermore, the superchannel may be well suited for transmission over very long distances, such as hundreds of kilometers, for example. A typical superchannel may comprise a set of subcarriers that are frequency multiplexed to form a single channel that are transmitted through optical transport network 101 as one entity. The subcarriers within the superchannel may be tightly packed to achieve high spectral efficiency.

In an optical network, such as optical transport network 101 in FIG. 1A, it is typical to refer to a management plane, a control plane, and a transport plane (sometimes called the physical layer). A central management host (see also FIG. 4) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, or an operational support system (OSS) which handles network-wide operations.

Modifications, additions or omissions may be made to optical transport network 101 without departing from the scope of the disclosure. For example, optical transport network 101 may include more or fewer elements than those depicted in FIG. 1A. Also, as mentioned above, although depicted as a point-to-point network, optical transport network 101 may comprise any suitable network topology for transmitting optical signals such as a ring, a mesh, or a hierarchical network topology.

In operation, optical transport network 101 represents a certain transmission capacity for data. As the demand for transmission capacity continues to increase, various methods may be employed to accommodate greater transmission capacity on optical transport network 101. For example, advanced modulation formats, such as 16QAM or 64QAM, may be used to increase transmission capacity per wavelength channel. The advanced modulation formats may be applied using transmitter 102 and receiver 112. However, the use of higher order modulation formats may result in decreased transmission reach (also referred to simply as 'reach') of the optical signal. For example, the reach may be determined by an acceptable value for bit error rate (BER) and accordingly OSNR, which may be observed at receivers 112.

Another strategy for increasing transmission capacity is the use of a superchannel, in which a plurality of subcarrier signals are densely packed in a fixed bandwidth band and may be transmitted at very high data rates, such as 400 Gb/s, 1 Tb/s, or higher. As noted above, optical superchannels may represent a promising solution for transmission of signals at 400 Gb/s and 1 Tb/s data rate per channel. However, as noted above, superchannels are typically used with flexible grid network components, which may not be universally available. Also, administration of superchannels may be associated with additional layers of network management, which may be undesirable in certain networks. While the use of superchannels typically enables an increase in transmission capacity, superchannels do not extend the transmission reach of optical signals using optical transport network 101.

In operation of optical transport network 101, in order to extend the transmission reach of certain optical signals, such as high capacity optical signals modulated using an advanced modulation format, constellation shaping may be applied to the optical signals. In constellation shaping, data bits are mapped and coded into improved constellations that may exhibit improved noise tolerance or increased OSNR. As a result of the improved noise tolerance, the reach of an optical signal in which constellation shaping has been applied may be increased, which is desirable for optical communication using optical transport network 101. In a typical modulation format (such as QPSK or MQAM), the symbols exhibit a uniform distribution in the complex plane, shown as uniformly distributed constellation points in a constellation diagram. When constellation shaping is applied to a modulation format, the distribution of the symbols in the complex plane is changed to provide an improved mapping for noise tolerance. In some instances, the distribution of symbols may be a Gaussian or Gaussian-like distribution that is shown as non-uniform constellation points in the constellation diagram (see also FIG. 3).

As noted above, transmitter 102 may be a universally programmable transceiver for applying different modulation formats, while receiver 112 may include the corresponding functionality for demodulation. Thus, transmitter 102 may support the use of constellation shaping and may be selectively programmed to apply constellation shaping on a per channel basis, while receiver 112 may correspondingly demodulate channels to which a certain kind of constellation shaping has been applied. In various embodiments, transmitter 102 and receiver 112 may include respective mapping/de-mapping functionality, such as within a digital signal processing (DSP) module, to enable implementation of constellation shaping in optical transport network 101.

In one example, constellation shaping may involve superposition mapping, as described in Equation 1.

$$y = y_I + jy_Q = \sum_{n=1}^{N} e^{j\pi b_n} h_n \qquad \text{Equation (1)}$$

In Equation 1:
y is the optical signal comprised of modulated symbols;
$y_I$ and $y_Q$ are the in-phase (real) and quadrature (imaginary) quadrature components;
N is the number of bits per symbol;
$b_n$ are the encoded binary bits; and
$h_n$ represents a weighted symbol mapping scheme, given by $h_n = \alpha_n e^{j\Theta_n}$, where $\alpha_n$ is an amplitude power factor and $\Theta_n$ is a phase power factor.

In this example, $h_n$ allocates a certain amplitude and phase to each symbol. By tuning the amplitude power factor $\alpha_n$ and the phase power factor $\Theta_n$, different superposition mapping schemes can be implemented. For example, in superposition coded mapping using phase-shifted modulation (PSM), the amplitude power factor $\alpha_n$ is kept constant and the phase power factor $\Theta_n$ is uniformly distributed in the complex plane. Additionally, different encoding schemes may be applied prior to superposition mapping, such as superposition coded mapping using bit-interleaved coded modulation. It is noted that when superposition mapping is used in a non-bijective (many-to-one) mapping, decoding and de-mapping at the receiver may involve iterative operations.

Other constellation shaping techniques include iterative polar modulation (IPM) and low-density parity check (LPDC) coded modulation with probabilistic shaping. Probabilistic shaping (PS) based on MQAM has been studied as a way to control spectral efficiency with finer granularity and to achieve an improved performance closer to Shannon capacity limit. In one example, PS-MQAM may be implemented using constant composition distribution matching (CCDM). Performing probabilistic shaping based on MQAM may improve utilization of network resources. In some cases, the shaped profile follows a Maxwell-Boltzmann distribution, as shown below.

$$P(x_i) = \frac{e^{-v|x_i|^2}}{\sum_{j'=1}^{M} e^{-v|x_{j'}|^2}},$$

v is a scaling factor determined by average power constraint and SNR

In the equation above, X is a discrete random variable with M possible symbols $\{x_1, x_2, \ldots x_M\}$, and P(X) is a probability mass function representing the probability of each symbol assigned.

In some embodiments, the minimum entropy of probabilistic shaping based on MQAM is 2 bits per symbol (per polarization), which corresponds to QPSK, where entropy, as a measure of information, is defined as the number of bits of information contained in each message or symbol, where channel noise is not considered. This measure is also sometimes referred to as the spectral efficiency or achievable information rate.

In general, probabilistic shaping (PS) of MQAM signals can result in a signal-to-noise ratio (SNR) (or an optical signal-to-noise, or OSNR) gain $G_S$ of up to 1.53 dB. This gain, which may be referred to as the shaping gain, may be used to extend transmission reach. It has been discovered that shaping gain $G_S$ for MQAM signals increases with an increase of modulation order m=$\log_2$ M. For example, for 16QAM signals, the entropy is typically 4 bits per symbol, where M is equal to 16 and m is equal to 4. However, probabilistically-shaped MQAM signals may have increased nonlinear noise compared to uniform distribution MQAM signals. In some embodiments, the amount of shaping gain $G_S$, obtained from the linear noise contribution, may be reduced by the OSNR loss due to fiber nonlinear interference ($L_{NLI}$) as follows:

$$\text{total gain } G_T(\text{dB})=G_S(\text{dB})-L_{NLI}(\text{dB})$$

In addition, higher order PS-MQAM signals (e.g., where M=64, 128, 256, or higher) may benefit from larger shaping gain, but may suffer from a larger nonlinear noise penalty. This may greatly reduce the overall shaping gain and, thus, reduce the benefit of probabilistic shaping.

In optical transport network 101, constellation shaping may be activated/deactivated as a procedure in network operations on a per channel basis for a given optical path. In this manner, the available spectrum may be flexibly allocated in terms of bandwidth and constellation shaping to meet various traffic demands, based on specific path information (distance, number/type of co-propagating channels, fiber type, and dispersion map), which may be economically desirable. Furthermore, constellation shaping using universal programmable transceivers in optical transport network 101 may provide improvements in reach with the same electronics and optical components that are already available and installed, which may enable a rapid upgrade to implement constellation shaping.

As noted above, entropy may be defined as the number of bits of information contained in each message or symbol. Entropy may be calculated using the following equation:

$$H(X)=-\Sigma_i P(x_i)\log_2 P(x_i) \quad \text{Equation (2)}$$

In Equation 2, X is a discrete random variable with M possible symbols $\{x_1, x_2, \ldots x_M\}$, and P(X) is a probability mass function representing the probability of each symbol assigned. For a uniform distribution, Equation 2 becomes:

$$H(X) = -\sum_{i=1}^{M} \frac{1}{M}\log_2 \frac{1}{M} \text{ or} \quad \text{Equation (3)}$$

$$H(X) = \log_2 M = m \text{ (bits/symbol)} \quad \text{Equation (4)}$$

In conventional systems, the optimum amount of optical power transmitted for a given optical transmission path is determined using numerical simulations for each possible uniform distribution modulation format and corresponding target distance. In some embodiments, systems may apply probabilistic constellation shaping to generate probabilistically shaped (PS) signals by digitally tuning the transmitters and receivers to cover a much wider range of spectral efficiency, with much finer granularity, than is possible with uniform distribution modulation formats. In these systems, the numerical simulations that would be required to determine the optimum fiber input power for all possible probabilistically shaped signals and distances may be prohibitively complex and time-consuming. In at least some embodiments, the systems and methods described herein may be used to determine a suitable fiber input power for probabilistically shaped signals in an optical transport network.

Labeled in FIG. 1A are the respective fiber input power values 122 at the inputs of each of the amplifiers 108. In FIG. 1A, the label 124 represents the output power ($P_{out}$) of each amplifier 108, which corresponds to the fiber input power with which probabilistically shaped signals are transmitted over the next fiber span. In at least some embodiments, the optimum fiber input power for a given optical transmission path, or channel thereof, depends on the received OSNR for a specific modulation scheme and on the link configuration of the optical transmission path. Therefore, the only way to achieve a higher received OSNR for the illustrated optical transport network is to increase the fiber input power. However, the fiber input power cannot be increased indefinitely due to its relationship with fiber nonlinearity. For example, in earlier systems, such as 2.5G telecommunication systems, the systems were too slow to exhibit noticeable nonlinear effects, even as fiber input power was increased. In current systems with much higher data rates, such as 100 Gbit/s, 400 Gbit/s, or 1 Tbit/s, fiber nonlinearity effects may be significant.

Figure 1B:
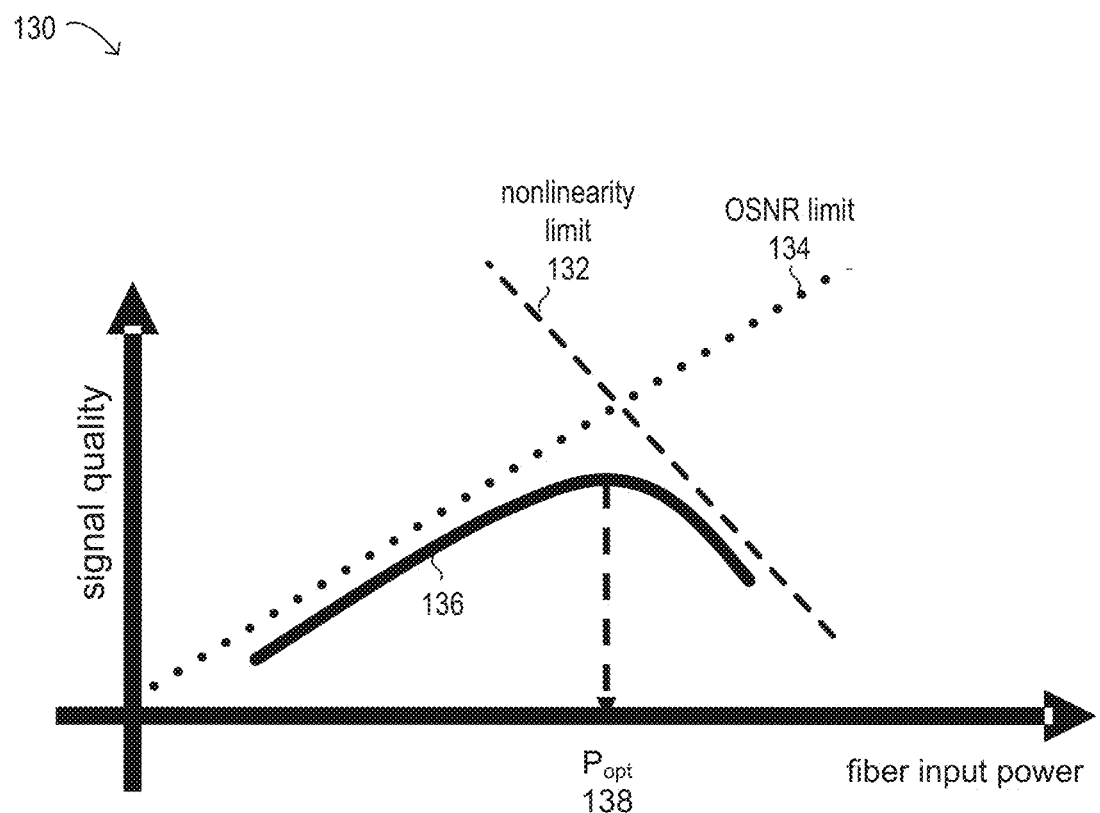
FIG. 1B is a graph illustrating a relationship between signal quality and signal power, in accordance with some embodiments.

As noted above, optimum fiber input $P_{opt}$ depends, at least on part, on fiber nonlinearity. FIG. 1B is a graph 130 illustrating a relationship between signal quality (in terms of OSNR, for example) and fiber input power (in terms of dBm, for example) on line 136. Graph 130 illustrates that, at a certain point, the optimum fiber input power 138 is reached, after which the signal quality decreases as the fiber input power continues to increase. In other words, after the point at which the nonlinearity limit 132 and the OSNR limit 134 intersect, nonlinearity effects begin to introduce penalties that reduce the received OSNR.

As previously noted, in conventional systems, $P_{opt}$ may be determined based on numerical simulations and/or experimentation and each modulation format may have its own $P_{out}$. In one example, during a simulation for the QPSK modulation format, the fiber input power may be varied from a very low value to a very high value and the OSNR may be measured or calculated as the fiber input power is varied. The OSNR measurements may be plotted against fiber input power as shown in FIG. 1B to determine an optimum fiber input power, $P_{opt}$, of plus two dBm per channel. In another example, during a simulation for the 16QAM modulation format, OSNR measurements may be plotted against fiber input power as shown in FIG. 1B to determine an optimum fiber input power, $P_{opt}$, of minus one dBm per channel. Following such simulations, an optical network would be designed based to use the determined optimum fiber input power.

The systems and methods described herein may be used to select a suitable fiber input power for probabilistically shaped signals in systems that support fine tuning in spectral efficiency through constellation shaping. As described in more detail below, in some embodiments, the method may include estimating fiber input power for probabilistically shaped signals based on fiber input power for reference modulation formats. In other embodiments, the method may include an adaptive selection of fiber input power for probabilistically shaped signals. In some embodiments, a network management system may select the fiber input power using one or more of the methods described herein and may configure one or more transponders and/or amplifiers to transmit probabilistically shaped signals using the selected fiber input power.

Figures 2A, 2B:
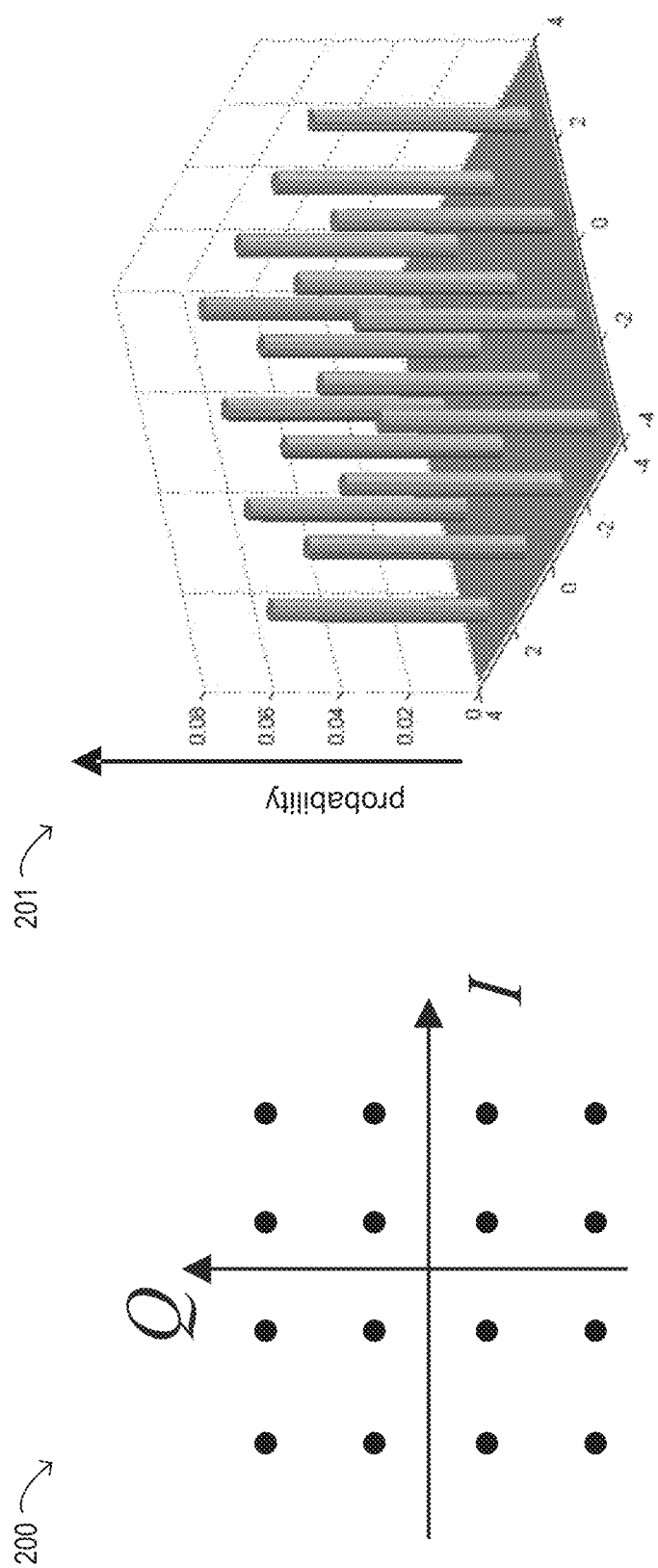
FIG. 2A illustrates selected elements of an embodiment of a constellation diagram in the complex plane.
FIG. 2B illustrates selected elements of an embodiment of a probability distribution diagram corresponding to the constellation diagram illustrated in FIG. 2A.

FIG. 2A illustrates selected elements of an embodiment of a constellation diagram 200 in the complex plane for 16QAM. In constellation diagram 200, a 16QAM constellation is shown having a uniform distribution of the 16 constellation points. In this example, for 16QAM with a uniform distribution, there would be 16 different symbols, each having a probability of $\frac{1}{16}^{th}$. FIG. 2B illustrates selected elements of an embodiment of a probability distribution diagram 201 corresponding to the constellation diagram 200 illustrated in FIG. 2A. The height of each column represents a probability value for a symbol in a corresponding position in constellation diagram 200. In this example, the probability of each symbol assigned is $\frac{1}{16}$ or 0.0625. Plugging the probability P=$\frac{1}{16}$ into Equation 2 above, plugging M=16 into Equation 3 above, or plugging M=16 into Equation 4, as shown below, yields an entropy of four bits per symbol.

$$\log_2 16 = 4 \text{ (bits/symbol)}$$

Figure 3:
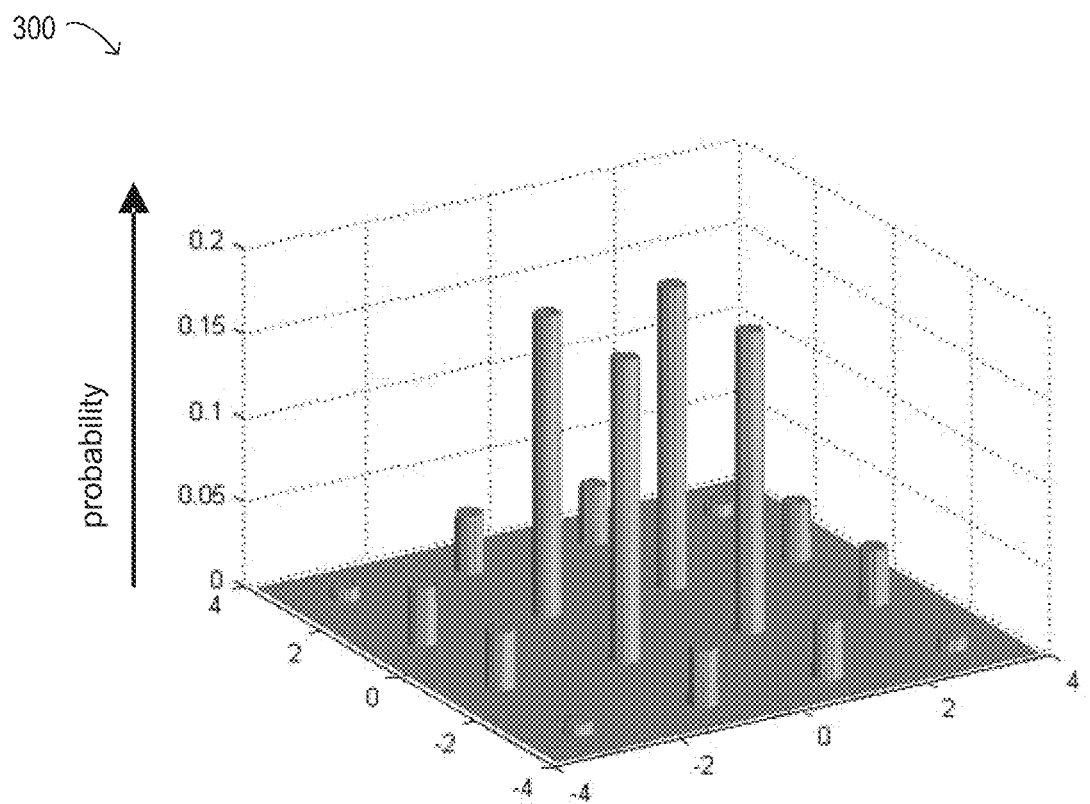
FIG. 3 illustrates selected elements of an embodiment of a probability distribution diagram for constellation points in a probabilistically-shaped 16QAM constellation.

Referring now to FIG. 3, selected elements of an embodiment of a probability distribution diagram 300 for constellation points in a probabilistically-shaped 16QAM constellation are shown. In probability distribution diagram 300, the probabilistically-shaped 16QAM constellation is shown having a non-uniform probability distribution of constellation points as an example of constellation shaping, as disclosed herein. The height of each column represents a probability value for a symbol in a corresponding position in a constellation diagram for 16QAM.

As illustrated in FIG. 3, probabilistic shaping is circularly symmetric, with the probability being dependent on the energy of the symbol. For example, all symbols at a same first distance from the center of the constellation have the same probability. In the illustrated example, probabilistic shaping has been applied to the 16QAM constellation to boost the relative probability of the four innermost symbols (when compared to a uniform distribution), and to decrease the probability of the other symbols. As a result of the shaping, eight symbols at a same second distance from the center of the constellation have the same energy and corresponding probability as each other, both of which are smaller than those of the four innermost symbols. The four outermost symbols at a same third distance from the center of the constellation (shown in FIG. 3 as the corner symbols in probability distribution diagram 300) have the same energy and corresponding probability as each other, and that probability is the smallest of those for the symbols in the constellation.

In an extreme case of probabilistic shaping for 16QAM, the innermost four symbols might each have a probability of 0.25, and all other symbols might have a probability of zero. This extreme case represents the lowest possible entropy of 2 bits/symbol, which corresponds to a QPSK modulation format. In this case, as shown in the equations for calculating entropy above, the number of bits per symbol is smaller than that of uniform 16QAM. Note, however, that in the example illustrated in FIG. 3, none of the symbols has a probability of zero. Therefore, the lowest possible entropy of 2 bits/symbol will not be achieved, in this example. Instead, the achieved entropy may be 3 bits/symbol. Note that by controlling the probability, the actual data rate for transmitting the information encoded in an optical signal may also be controlled.

Figure 4:
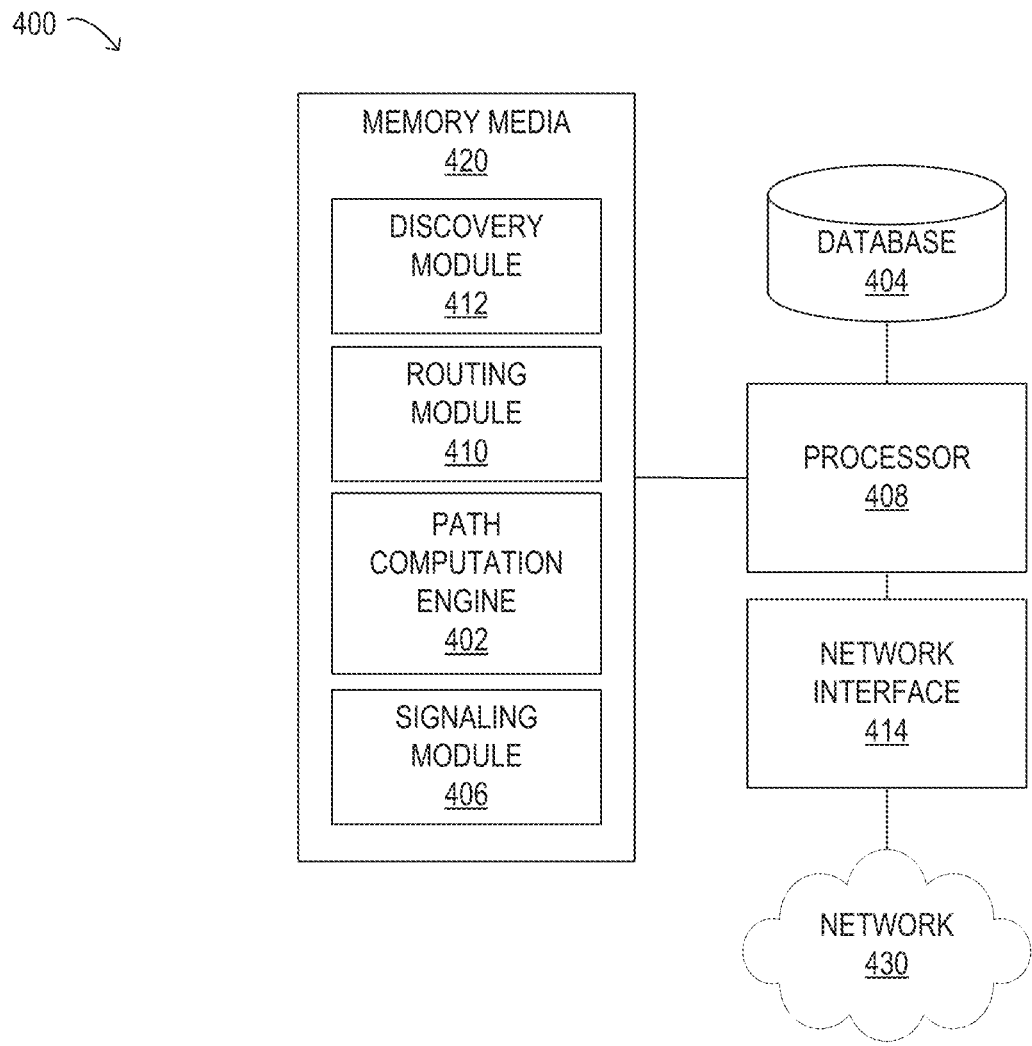
FIG. 4 is a block diagram of selected elements of an embodiment of network management system 300 for implementing control plane functionality in optical networks.

Referring now to FIG. 4, a block diagram of selected elements of an embodiment of network management system 400 for implementing control plane functionality in optical networks, such as, for example, in optical transport network 101 (see FIG. 1A), is illustrated. A control plane may include functionality for network intelligence and control and may comprise applications that support the ability to establish network services, including applications or modules for discovery, routing, path computation, and signaling, as will be described in further detail. The control plane applications executed by network management system 400 may work together to automatically establish services within the optical network. Discovery module 412 may discover local links connecting to neighbors. Routing module 410 may broadcast local link information to optical network nodes while populating database 404. When a request for service from the optical network is received, path computation engine 402 may be called to compute a network path using database 404. This network path may then be provided to signaling module 406 to establish the requested service.

As shown in FIG. 4, network management system 400 includes processor 408 and memory media 420, which may store executable instructions (i.e., executable code) that may be executable by processor 408, which has access to memory media 420. Processor 408 may execute instructions that cause network management system 400 to perform the functions and operations described herein. For the purposes of this disclosure, memory media 420 may include non-transitory computer-readable media that stores data and instructions for at least a period of time. Memory media 420 may comprise persistent and volatile media, fixed and removable media, and magnetic and semiconductor media. Memory media 420 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 420 is operable to store instructions, data, or both. Memory media 420 as shown includes sets or sequences of instructions that may represent executable computer programs, namely, path computation engine 402, signaling module 406, discovery module 412 and routing module 410.

Also shown included with network management system 400 in FIG. 4 is network interface 414, which may be a suitable system, apparatus, or device operable to serve as an interface between processor 408 and network 430. Network interface 414 may enable network management system 400 to communicate over network 430 using a suitable transmission protocol or standard. In some embodiments, network interface 414 may be communicatively coupled via network 430 to a network storage resource. In some embodiments, network 430 represents at least certain portions of optical transport network 101. In certain embodiments, network 430 may include at least certain portions of a public network, such as the Internet. Network 430 may be implemented using hardware, software, or various combinations thereof.

In certain embodiments, the control plane may be configured to interface with a person (i.e., a user) and receive data about the signal transmission path. For example, the control plane may also include and/or may be coupled to one or more input devices or output devices to facilitate receiving data about the signal transmission path from the user and outputting results to the user. The one or more input and output devices (not shown) may include, but are not limited to, a keyboard, a mouse, a touchpad, a microphone, a display, a touchscreen display, an audio speaker, or the like. Alternately or additionally, the control plane may be configured to receive data about the signal transmission path from a device such as another computing device or a network element (not shown in FIG. 4), for example via network 430.

As shown in FIG. 4, in some embodiments, discovery module 412 may be configured to receive data concerning an optical signal transmission path in an optical network and may be responsible for discovery of neighbors and links between neighbors. In other words, discovery module 412 may send discovery messages according to a discovery protocol, and may receive data about the optical signal transmission path. In some embodiments, discovery module 412 may determine features, such as, but not limited to: fiber type, fiber length, number and type of components, data rate, modulation format of the data, input power of the optical signal, number of signal-carrying wavelengths (i.e., channels), channel spacing, traffic demand, and network topology, among others.

As shown in FIG. 4, routing module 410 may be responsible for propagating link connectivity information to various nodes within an optical network, such as optical transport network 101. In particular embodiments, routing module 410 may populate database 404 with resource information to support traffic engineering, which may include link bandwidth availability. Accordingly, database 404 may be populated by routing module 410 with information usable to determine a network topology of an optical network.

Path computation engine 402 may be configured to use the information provided by routing module 410 to database 404 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 402 may consider the interplay between the transmission degradation factors. In various embodiments, path computation engine 402 may generate values for specific transmission degradation factors. Path computation engine 402 may further store data describing the optical signal transmission path in database 404.

In FIG. 4, signaling module 406 may provide functionality associated with setting up, modifying, and tearing down end-to-end networks services in optical transport network 101. For example, when an ingress node in the optical network receives a service request, the control plane may employ signaling module 406 to request a network path from path computation engine 402 that may be optimized according to different criteria, such as bandwidth, cost, etc. When the desired network path is identified, signaling module 406 may then communicate with respective nodes along the network path to establish the requested network services. In different embodiments, signaling module 406 may employ a signaling protocol to propagate subsequent communication to and from nodes along the network path.

In operation of network management system 400, path computation engine 402, or another entity or module, may provide path information associated with a given optical path, such as a distance, a number and type of optical channels to be transmitted, a fiber type, and a dispersion map. For example, signaling module 406, or another entity or module, may receive the path information and may determine the modulation format to be used for a given optical channel and whether or not to apply constellation shaping. In some embodiments, path computation engine 402, or another entity or module, may select a suitable shaping parameter pair based on characteristics of the transmission media and initiate the configuration of one or more transponders to set the entropy and the forward error correction code rate for the optical path in accordance with the shaping strength level and error correction strength level of the selected shaping parameter pair. In order to activate probabilistic constellation shaping, signaling module 406 may send a first command to each transmitter for each of the optical channels, respectively, indicating the modulation format to which probabilistic constellation shaping should be applied, along with the selected entropy and the selected forward error correction code rate. Then, signaling module 406 may send a second command to each receiver corresponding to each transmitter to activate probabilistic constellation shaping. Transmitters and receivers having universal programmable transponder functionality may receive the commands from signaling module 406 and may then activate or deactivate transmission of the optical channels using constellation shaping in accordance with the received commands.

In operation of network management system 400, after an optical path has been provisioned, network management system 400 may configure and/or reconfigure transmitters 102 and receivers 112 to implement a suitable modulation format, symbol rate, entropy, FEC code rate, and amount of optical power transmitted for the optical path as determined by network management system 400 in response to changing conditions. In some embodiments, network management system 400 (e.g., signaling module 406 or another element of network management system 400) may perform some or all of the methods described herein for selecting fiber input power for probabilistically shaped signals and may configure and/or reconfigure amplifiers 108 accordingly. In at least some embodiments, network management system 400 may monitor a bit error rate (BER) or optical signal-to-noise ratio (OSNR) as a quality metric of a received optical channel (e.g., a single carrier or multi-carrier channel) by receiving the BER or OSNR from a receiver DSP (not shown). In some embodiments, network management system 400 may calculate a measure of performance (such as a Q-factor) for an optical path from a monitored measure of performance data received from the receiver DSP or may estimate a measure of performance for an optical path using Gaussian Noise modeling.

Figure 5:
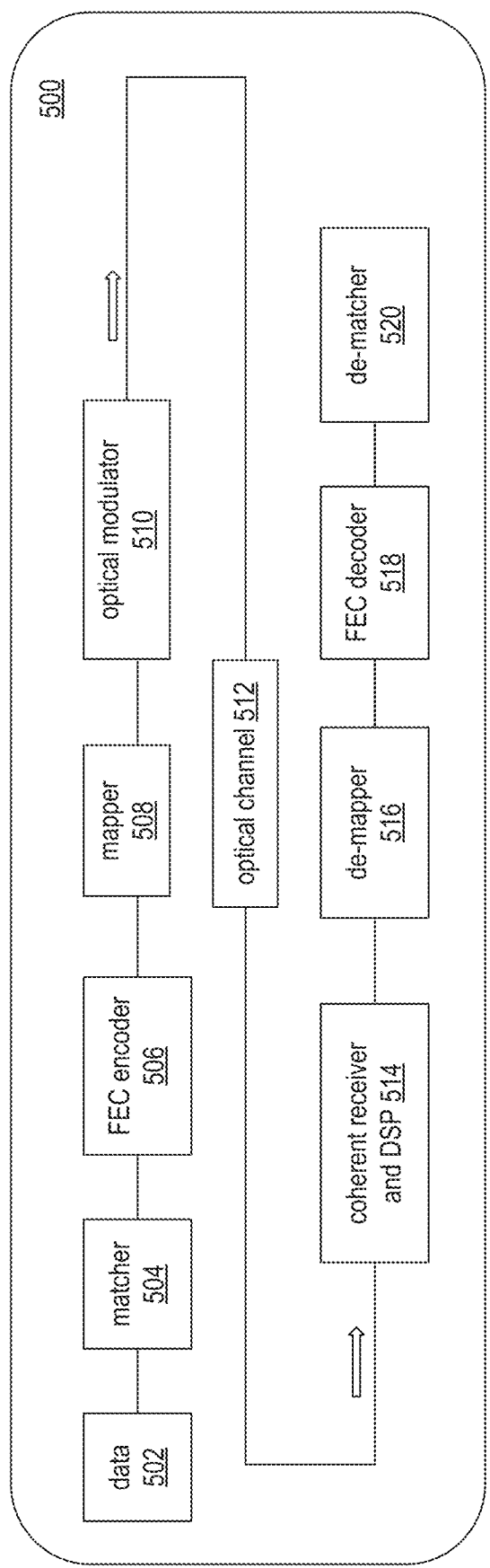
FIG. 5 is a schematic diagram illustrating selected elements of an example embodiment of an optical transmission system configured to apply probabilistic shaping to one or more WDM channels in an optical network.

FIG. 5 is a schematic diagram illustrating selected elements of an example embodiment of an optical transmission system 500 configured to apply probabilistic shaping to one or more WDM channels in an optical network. As illustrated in this example, in some embodiments transmission system 500 includes elements similar to those of a conventional transmitter/receiver including, on the transmitter side, binary data 502 that is provided to optical transmission system 500 for transmission, forward error correction (FEC) encoder 506, mapper 508, and optical modulator 510, an optical channel 512 comprising a suitable transmission media, and, on the receiver side, coherent receiver and DSP element 514, de-mapper 516, and FEC decoder 518.

In order to apply probabilistic shaping, transmission system 500 also includes matcher 504 on the transmitter side and de-matcher 520 on the receiver side. The matcher may ensure that the center constellation points have a higher probability of occurrence than the edge constellation points. For example, matcher 504 may be configured to control the probability of occurrence of certain constellation points on the transmitter side to shape the distribution of the constellation points, and de-matcher 520 may be configured to reverse the probabilistic shaping process.

In the illustrated embodiment, matcher 504 receives the binary data 502 and generates data that is modified to achieve a particular probability profile based, for example, on a target probability distribution. Following matcher 504, FEC encoder 506 and symbol mapper 508 may add forward error correction encodings and map portions of binary data 502 (now with probabilities shaped by matcher 504) to respective symbols before providing outputs to optical modulator 510 for transmission over optical channel 512. For example, the mapping may include generating a respective codeword for each symbol and providing data representing the respective codewords mapped to the symbols to the optical modulator 510 for transmission. In some embodiments, optical channel 512 may include one or more amplifiers, each of which is configured to transmit probabilistically shaped signals using a fiber input power selected (e.g., by signaling module 406 or another element of network management system 400) using one or more of the methods described herein.

In the illustrated embodiment, coherent receiver and DSP 514 may, using de-mapper 516, retrieve the modified and mapped portions of binary data 502 that were provided to optical modulator 510 and transmitted over optical channel 512. Subsequently, this binary data may be processed by FEC decoder 518 and de-matcher 520 to recover the originally received binary data 502.

In various embodiments, coherent receiver and DSP element 514 may include any or all of an I/Q imbalance compensation element, a chromatic dispersion compensation element, an adaptive equalizer, a polarization de-multiplexer, a frequency offset compensation element, a carrier phase recovery element, and/or a cycle slip compensation element.

In one example, probabilistic constellation shaping may be applied in a transponder configured to transmit an optical signal using 64QAM. By apply probabilistic shaping, the spectral efficiency can vary from 64QAM to QPSK (e.g., from 6 bits per symbol per polarization to 2 bits per symbol per polarization) with very fine tuning. In some embodiments, the spectral efficiency may be varied in increments of less than one bit per symbol. For example, instead of the spectral efficiency being configurable with values of just 6 or 5 bits per symbol, the spectral efficiency may be configurable with values of 5.1, 5.5, or 5.9 bits per symbol, as an example. In some embodiments, using matcher 504 and de-matcher 520, one transponder may be able to cover the whole range of spectral efficiency between 2 bits per symbol and 6 bits per symbol.

In some embodiments, the achievable reach for an optical transmission path may be estimated based on the configuration of the links along the path. In addition, the achievable information rate that can be supported on the optical transmission path may be estimated based on the link configuration and a received or estimated OSNR for the path.

Figure 6:
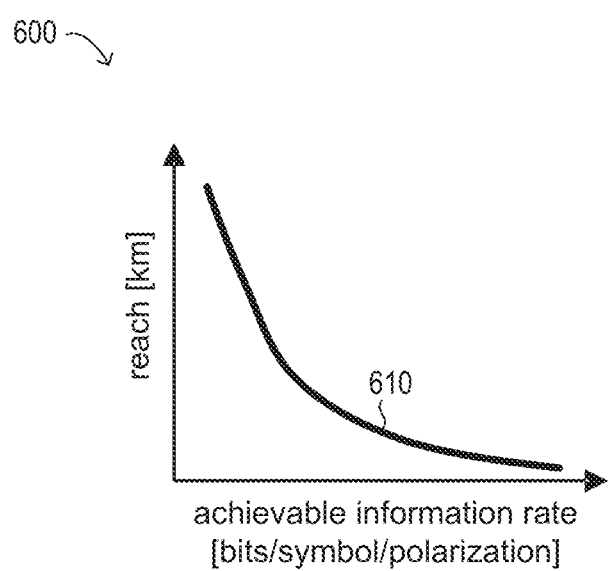
FIG. 6 illustrates an example curve that maps reach versus achievable information rate, or spectral efficiency, in accordance with some embodiments.

FIG. 6 illustrates a plot 600 including an example curve 610 that maps reach (in kilometers) versus an achievable information rate, or spectral efficiency (in bits per symbol per polarization). In some embodiments, the data plotted as curve 610 may be accessed to determine an achievable information rate for a given target reach. In at least some embodiments, this information may also be used to determine a target entropy or a target forward error correction code rate for a given optical transmission path, as described herein.

In certain embodiments, the optical transponders in an optical transport network may be capable of adjusting the number of FEC overhead bytes based on monitored performance measures or on a feedback mechanism between communicating pairs of optical transponders or other factors. In at least some embodiments, each of the optical transponders may be enabled to implement two or more modulation formats. For example, each of the transponders may support two or more adaptive modulation formats including, but not limited to, FSK, ASK, BPSK, QPSK, 8QAM, 16QAM, 32QAM, among others. In addition, the optical transponders may be capable of adjusting the symbols rates at which traffic is transmitted over particular optical paths and/or the amount of optical power transmitted. In at least some embodiments, the modulation format, symbol rate, the entropy, the number of FEC overhead bytes (sometimes referred to as the FEC ratio or FEC code rate), and/or the amount of optical power transmitted for a given optical path may be modified by network management system 400 in response to the addition of a new optical path in an optical transport network, the subsequent recalculation of a system margin for an existing path, or other changes in the optical transport network. For example, in certain embodiments, the modulation format, symbol rate, the number of FEC overhead bytes, and/or an amount of optical power transmitted may be modified for an optical path of a given span length that exhibits performance degradation due to nonlinear effects caused by the addition of an optical path or degradation of the transmission media itself. In some embodiments, one or more transponders and/or amplifiers may be configured or reconfigured to transmit probabilistically shaped signals using a fiber input power selected using one or more of the methods described herein.

In at least some embodiments, a target achievable transmission rate (AIR) for probabilistic constellation shaping may be reliably achieved as follows:

$$AIR=H(X)-(1-r)*m(\text{bits/symbol})$$

Here, the achievable information rate is calculated based on the entropy $H(X)$ of the probabilistically-shaped signal, which represents the number of bits per symbol that can be put in the modulation format. Here, the calculation of AIR is further dependent on the FEC code rate, $r$, and the number of levels, $m$, in the constellation. For example, when probabilistic shaping is applied to 16QAM, $m=4$.

In some embodiments, to achieve a particular transmission rate AIR when applying probabilistic shaping to different modulation formats, the FEC code rate, $r$, may be fixed and the entropy $H(X)$ of the PS-MQAM signals may be changed. For example, the entropy $H(X)$ may be adjusted in the distribution matcher (such as matcher 504 illustrated in FIG. 5), which produces a non-uniform sequence within a block length. The matcher changes the occurrence of each symbol within a block length to adjust the entropy $H(X)$ to the desired level, and lower-energy points are transmitted with higher probability. This is illustrated by way of example in Table 1 below. In the example illustrated in Table 1, the target achievable information rate is 3.3 bits per symbol per polarization, and the FEC code rate is fixed at 3/4, representing that for every four bits transmitted, three of them are information bits and one is an error correction bit, such as a parity bit.

TABLE 1

Achieving a given AIR with a fixed FEC code rate

| PS-MQAM | r | m | (1 − r) * m | H(X) | AIR |
|---|---|---|---|---|---|
| PS-32QAM | 3/4 | 5 | 1.25 | 4.55 | 3.3 |
| PS-64QAM | 3/4 | 6 | 1.5 | 4.8 | 3.3 |
| PS-256QAM | 3/4 | 8 | 2 | 5.3 | 3.3 |

As shown in Table 1, for probabilistically-shaped 32QAM, the entropy would need to be 4.55 per symbol per polarization to meet the target achievable information rate of 3.3 bits per symbol per polarization, given the modulation order, m, of five. For probabilistically-shaped 64QAM, the entropy would need to be increased to 4.8, because the modulation order, m, is six. For probabilistically-shaped 256QAM, the entropy would need to be increased to 5.3, because the modulation order, m, is eight. In some embodiments, the entropy may be adjusted by adjusting a parameter of the probabilistic shaping through digital signal processing. For example, in some embodiments, the transmitter may apply a Maxwell-Boltzmann Distribution in which the value of a shaping factor can be tuned to achieve the desired entropy.

In some embodiments, to achieve a particular transmission rate AIR when applying probabilistic shaping to different modulation formats, the entropy H(X) of the PS-MQAM signals may be fixed and the FEC code rate, r, may be changed. This is illustrated by way of example in Table 2 below. In the example illustrated in Table 2, the target achievable information rate is 3 bits per symbol per polarization, and the entropy is fixed at 4.

TABLE 2

Achieving a given AIR with a fixed entropy

| PS-MQAM | r | m | (1 − r) * m | H(X) | AIR |
|---|---|---|---|---|---|
| PS-16QAM | 3/4 | 4 | 1 | 4 | 3 |
| PS-32QAM | 4/5 | 5 | 1 | 4 | 3 |
| PS-64QAM | 5/6 | 6 | 1 | 4 | 3 |

As shown in Table 2, for probabilistically-shaped 32QAM, the FEC code rate, r, would need to be 4/5 to meet the same target achievable information rate of 3 bits per symbol per polarization as in the case of a modulation format of PS-16QAM and a FEC code rate, r, of 3/4. For probabilistically-shaped 64QAM, the FEC code rate, r, would need to be increased to 5/6 to achieve the same AIR. In the case of 64QAM, an entropy of four bits per symbol per polarization entropy is shown in Table 2, indicating that stronger shaping is applied using the second approach, compared to the case of 64QAM in Table 1, with an entropy of 4.8.

Figure 7A:
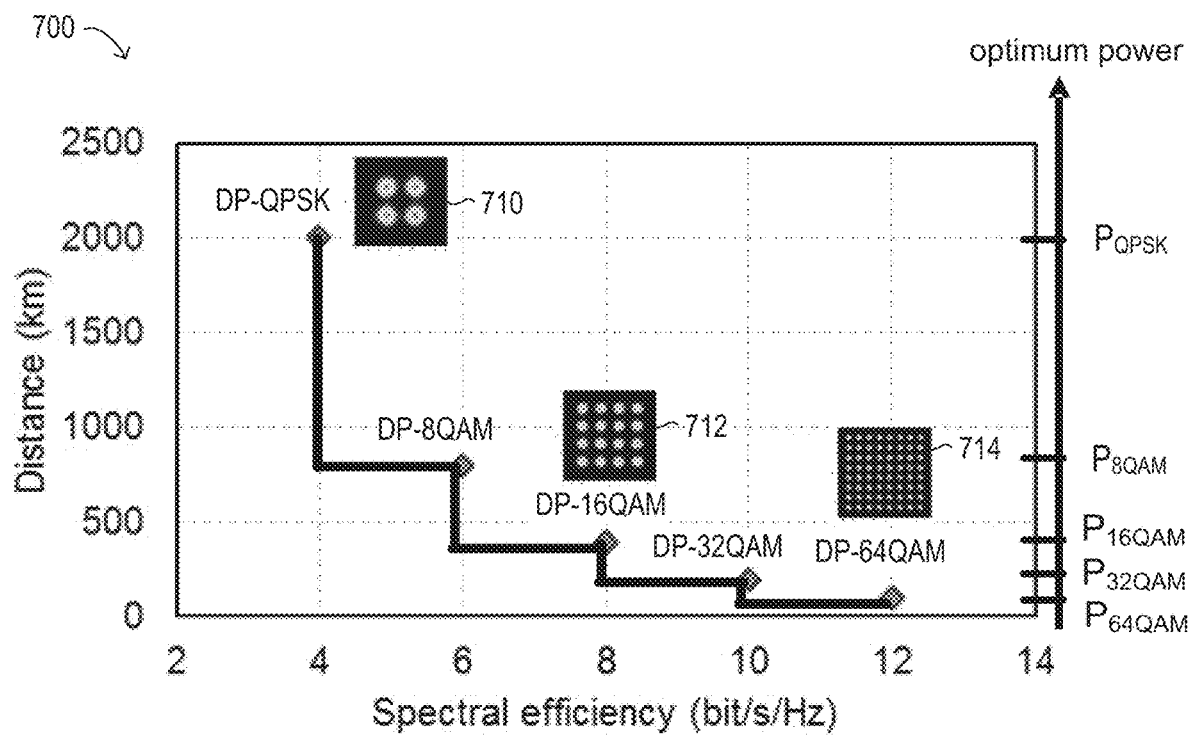
FIG. 7A is a graph illustrating a relationship between distance and spectral efficiency for multiple MQAM modulation formats with uniform distribution, according to some embodiments.

FIG. 7A is a graph 700 illustrating a relationship between distance (in km) based on received OSNR and spectral efficiency (in bits per symbol per hertz) for five dual-polarization MQAM modulation formats with uniform distribution (i.e., without probabilistic shaping), according to some embodiments. As the order of the modulation format increases, the reach decreases and the spectral efficiency increases, such that DP-QPSK is associated with the longest reach and lowest spectral efficiency and DP-64QAM is associated with the shortest reach and the highest spectral efficiency. For example, graph 700 illustrates a relationship between distance and spectral efficiency for DP-QPSK, with a typical reach on the order of 2000 km and a spectral efficiency of 2 bits per symbol per polarization for a total of 4 bits per symbol per hertz. Graph 700 also illustrates a relationship between distance and spectral efficiency for DP-8QAM, with a typical reach on the order of 800 km and a spectral efficiency of 6, DP-16QAM, with a typical reach on the order of 400 km and a spectral efficiency of 8, DP-32QAM, with a typical reach on the order of 200 km and a spectral efficiency of 10, and DP-64QAM, with a typical reach on the order of 100 km and a spectral efficiency of 12. Note that these values may be different in systems having fibers of a different fiber type or fibers of multiple fiber types.

Also shown in FIG. 7A are respective values for optimum fiber input power for each of these modulation formats. As the order of the modulation increases, the optimum fiber input power decreases, such that DP-QPSK is associated with highest the optimum power and DP-64QAM is associated with the lowest optimum power, in this example. Respective constellation diagrams for DP-QPSK (710), DP-16QAM (712), and DP-64QAM (714) are shown in FIG. 7A.

Figure 7B:
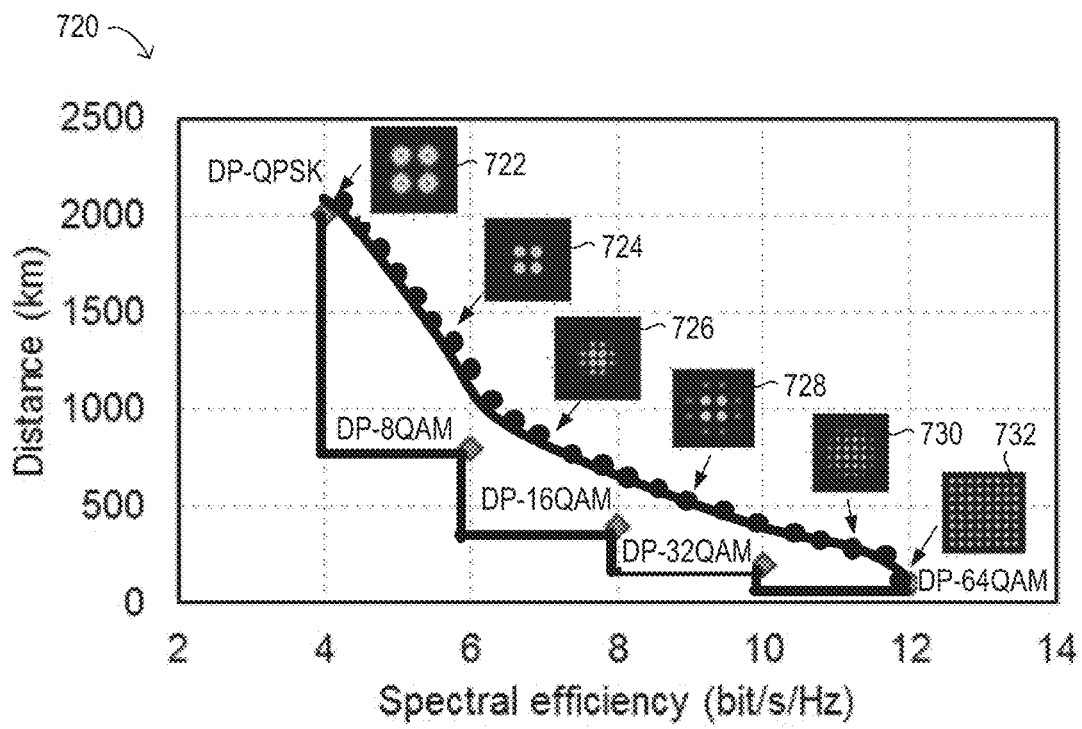
FIG. 7B is a graph illustrating the effects of constellation shaping on MQAM modulation formats, according to some embodiments.

FIG. 7B is a graph 720 illustrating the effects of constellation shaping on MQAM modulation formats, according to some embodiments. More specifically, FIG. 7B illustrates the effects of applying different shaping factors to a DP-64QAM modulation format with uniform distribution, shown as constellation diagram 732. As the amount of shaping applied is increased, the spectral efficiency decreases, allowing very fine tuning of the spectral efficiency and a corresponding increase in reach. Each dot along the curve shown in FIG. 7B represents a respective point at which a different shaping factor is applied to the constellation for the DP-64QAM modulation format. For example, constellation diagram 730 illustrates the result of applying a relatively weak shaping factor, resulting in a spectral efficiency of 11.6 and a reach of 310. Examples of the application of successively stronger shaping factors are shown in constellation diagram 728, with a spectral efficiency of 8.9 and a reach of 510, constellation diagram 726, with a spectral efficiency of 6.7 and a reach of 850, constellation diagram 724, with a spectral efficiency of 5.8 and a reach of 1370, and constellation diagram 722, with a spectral efficiency of 4 and a reach of 2000, similar to the spectral efficiency and reach of DP-QPSK.

As previously noted, it may be prohibitively complex and time-consuming to perform simulations to determine an optimum fiber input power for all values of spectral efficiency that are possible in systems that implement probabilistic shaping. In addition, the differences in the optimum fiber input power settings between those points of different spectral efficiency may be very small. In some cases, although the amplifiers in an optical transport network may have a wide dynamic range, they may not have a granularity of step sufficient to distinguish between neighboring points of spectral efficiency. In one example, simulations may indicate that the difference in the optimum fiber input power for two spectral efficiency values corresponds to an increase in fiber input power of 0.01 dBm. However, the amplifiers in the optical transport network may only be able to adjust their output power, $P_{out}$, which corresponds to fiber input power, in increments of 0.1 or even 0.5 dBm.

Figure 8:
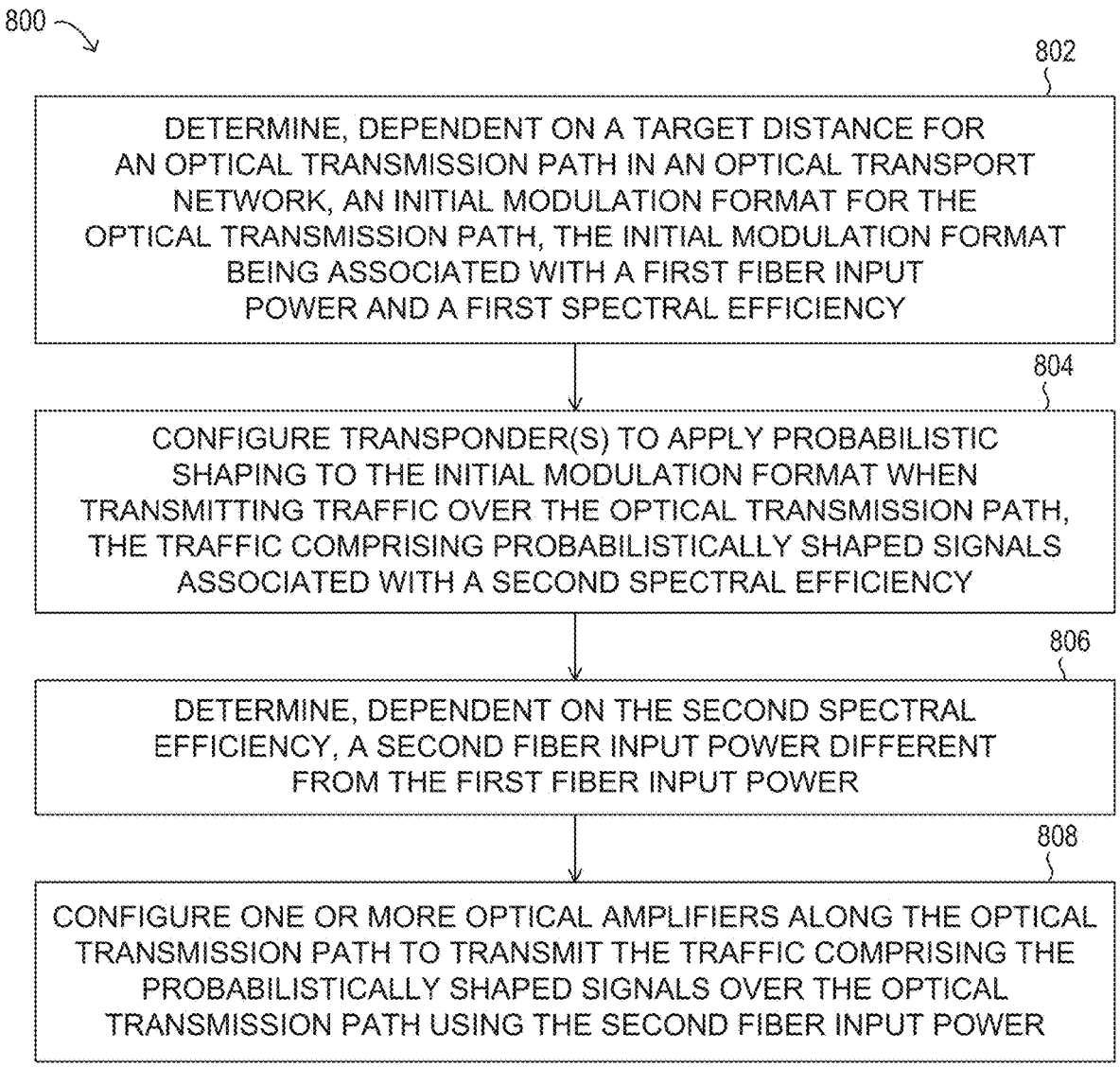
FIG. 8 is a block diagram of selected elements of an embodiment of a method for selecting fiber input power for probabilistically shaped signals, depicted in flowchart form.

FIG. 8 is a block diagram of selected elements of an embodiment of a method 800 for selecting fiber input power for probabilistically shaped signals, depicted in flowchart form. Method 800 may be performed using optical transport network 101. In some embodiments, network management system 400 illustrated in FIG. 4 may be configured to select fiber input power for probabilistically shaped signals as well as send commands to optical transponders and/or amplifiers to configure them to apply the selected fiber input power, as described herein. Although method 800 is described in the singular in terms of an optical transmission path among a plurality of optical transmission paths, it will be understood that operations in method 800 may be repeated or duplicated, either in parallel or serially, for any plurality of optical transmission paths. It is noted that certain operations described in method 800 may be optional or may be rearranged in different embodiments.

Method 800 may begin at 802 by determining, dependent on a target distance for an optical transmission path in an optical transport network, an initial modulation format for the optical transmission path, the initial modulation format being associated with a first fiber input power and a first spectral efficiency. In at least some embodiments, the initial modulation format may represent a uniform distribution QAM modulation format selected from among a plurality of QAM modulation formats supported in the optical transport network.

Method 800 may include, at 804, configuring one or more transponders to apply probabilistic shaping to the initial modulation format when transmitting traffic over the optical transmission path, the traffic comprising probabilistically shaped signals associated with a second spectral efficiency.

At 806, the method may include determining, dependent on the second spectral efficiency, a second fiber input power different from the first fiber input power.

At 810, method 800 may include configuring one or more optical amplifiers along the optical transmission path to transmit the traffic comprising the probabilistically shaped signals over the optical transmission path using the second fiber input power.

In some cases, when probabilistic shaping is applied to a QAM modulation format, the resulting probabilistically shaped signals may have the same spectral efficiency as a uniform distribution modulation format of a different order, indicating that the optimum fiber input power for the probabilistically shaped signals might be the same as for the uniform distribution modulation format. However, because probabilistically shaped signals incur slightly higher penalties due to fiber nonlinearity, the performance of the probabilistically shaped signals using the same fiber input power as for the uniform distribution modulation format may be less than for the uniform distribution modulation format. For example, if probabilistic shaping is applied to 16QAM resulting in a spectral efficiency that is effectively the same as the spectral efficiency of QPSK, the performance of the probabilistically shaped signals may be less than for QPSK. Therefore, the optimum fiber input power for the probabilistically shaped signals may need to be set a little lower than for QPSK to compensate for the increased penalty due to fiber nonlinearity.

In some embodiments, the optimum fiber input power for a probabilistically shaped MQAM signal may be estimated based on the optimum fiber input power for a reference uniform distribution modulation format having a spectral efficiency value nearest the spectral efficiency value of the probabilistically shaped signal, with an incremental increase or decrease. More specifically, the optimum fiber input power for a probabilistically shaped MQAM signal may be estimated as follows:

$$P^{PS\text{-}MQAM}(@SE=SE_{Ref;U\text{-}MQAM}+\Delta SE)(dBm)=(P_{opt}^{ref;U\text{-}MQAM}-\Delta P)(dBm)$$

Here, $\Delta SE$ may be up to one half the difference between the spectral efficiency values of two neighboring reference modulation formats and $\Delta P$ may be up to one half the difference between the optimum fiber input power values for the two neighboring reference modulation formats. This approach to estimating the optimum fiber input power for a probabilistically shaped signal may be further illustrated by the example graph shown in FIG. 9.

Figure 9:
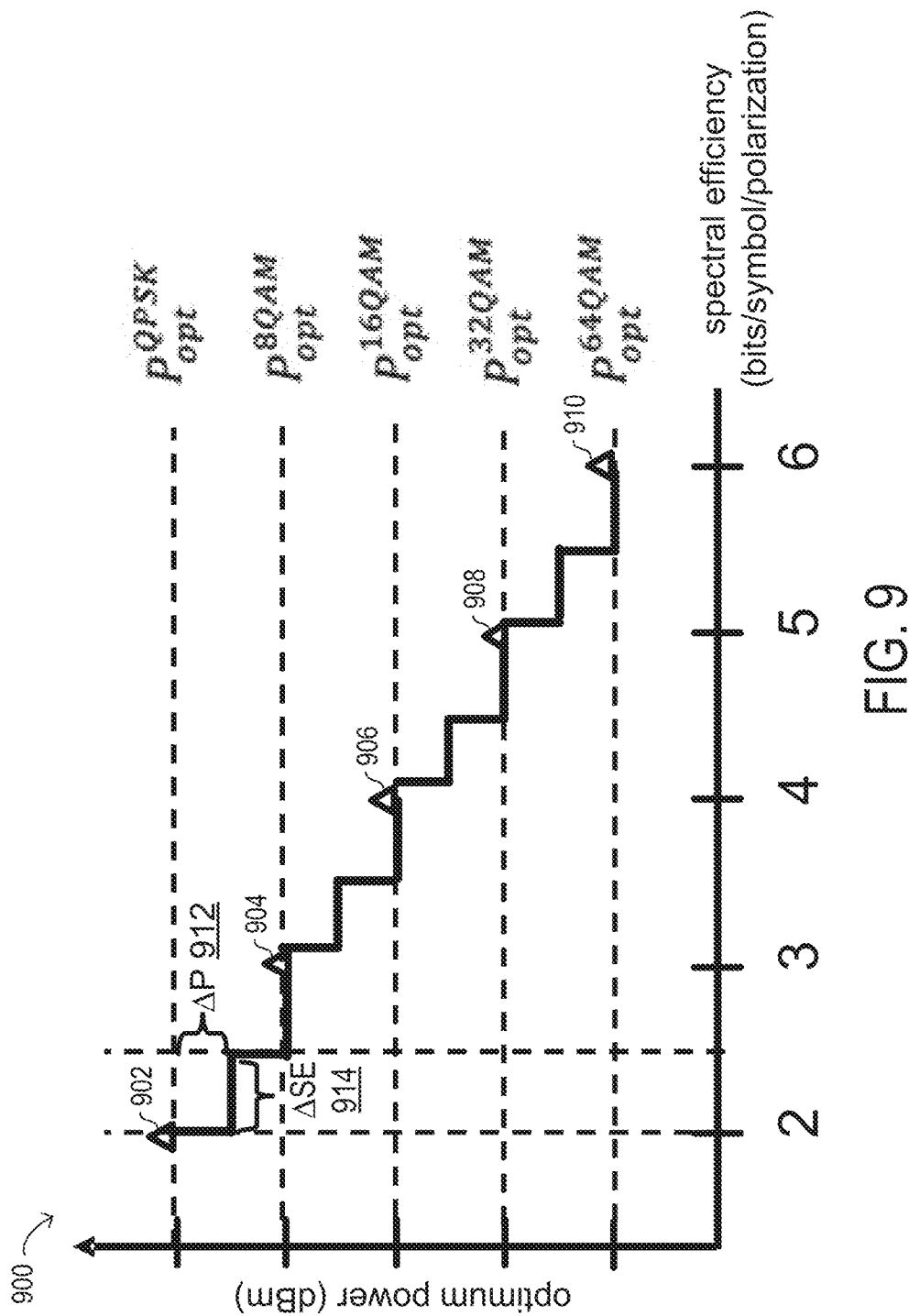
FIG. 9 is a graph illustrating a relationship between optimum power and spectral efficiency for probabilistically shaped signals, according to some embodiments.

FIG. 9 is a graph 900 illustrating a relationship between optimum power (dBm) and spectral efficiency (bits/symbol/polarization), according to some embodiments. In this example, the triangles represent optimum fiber input power settings for conventional uniform distribution MQAM signals. In this example, applying probabilistic shaping to DP-64QAM results in a probabilistically shaped signal with a spectral efficiency of 2.3 bits per symbol per polarization. This spectral efficiency value falls slightly above the spectral efficiency value for a first reference modulation format of DP-QPSK, at 2 bits per symbol per polarization, and below the spectral efficiency value for a second reference modulation format of DP-8QAM, which is the next highest order MQAM format, at 3 bits per symbol per polarization. Here, the difference between the spectral efficiencies for the two reference modulation formats is 1.

In the illustrated example, $\Delta SE$ 914 represents the difference between the spectral efficiency of the probabilistically shaped signal and signals transmitted using the first reference modulation format of DP-QPSK with uniform distribution, or 0.3. In this case, the spectral efficiency of the probabilistically shaped signal is closer to the spectral efficiency associated with the first reference modulation format than to the spectral efficiency associated with the second reference modulation format. Here, $\Delta SE$ 914 is less than one half the difference between the spectral efficiency associated with the first reference modulation format (DP-QPSK) and the spectral efficiency associated with the second reference modulation format (DP-8QAM), which is 0.5. Therefore, the optimum fiber input power for the probabilistically shaped signal may be estimated by subtracting an incremental amount shown as $\Delta P$ 912 from the optimum fiber input power for DP-QPSK. In this example, $\Delta P$ 912 represents one half the difference between the optimum fiber input power for the first reference modulation format (DP-QPSK) and the optimum fiber input power for the second reference modulation format (DP-8QAM). In one example, the optimum fiber input power for DP-QPSK, for a specific link configuration, may be plus two dBm per channel. The optimum fiber input power for DP-8QAM, for a specific link configuration, may be zero dBm per channel. In this example, $\Delta P$ 912 may be one half the difference between the optimum fiber input power values for the two reference modulation format, or 1.

In an example in which applying probabilistic shaping to DP-64QAM results in a probabilistically shaped signal with a spectral efficiency of 2.7 bits per symbol per polarization, such that the spectral efficiency of the probabilistically shaped signal is closer to the spectral efficiency associated with the second (higher order) reference modulation format (DP-8QAM) than to the spectral efficiency associated with the first (lower order) reference modulation format (DP-QPSK), the optimum fiber input power for the probabilistically shaped signal may be estimated as being equal to the optimum fiber input power associated with the second reference modulation format (DP-8QAM). This approach may lead to a somewhat conservative fiber input power setting, thus preserving some OSNR margin to ensure accuracy and/or operability. In some embodiments, the somewhat coarse approach to estimating optimum fiber input power for probabilistically shaped signals described above may be well suited for use in optical transport networks with relatively high OSNR margin, in that the somewhat conservative approach may make the network very reliable. For example, this approach may ensure that a small error in the estimation of optimum fiber input power will not render the network inoperable.

Figure 10:
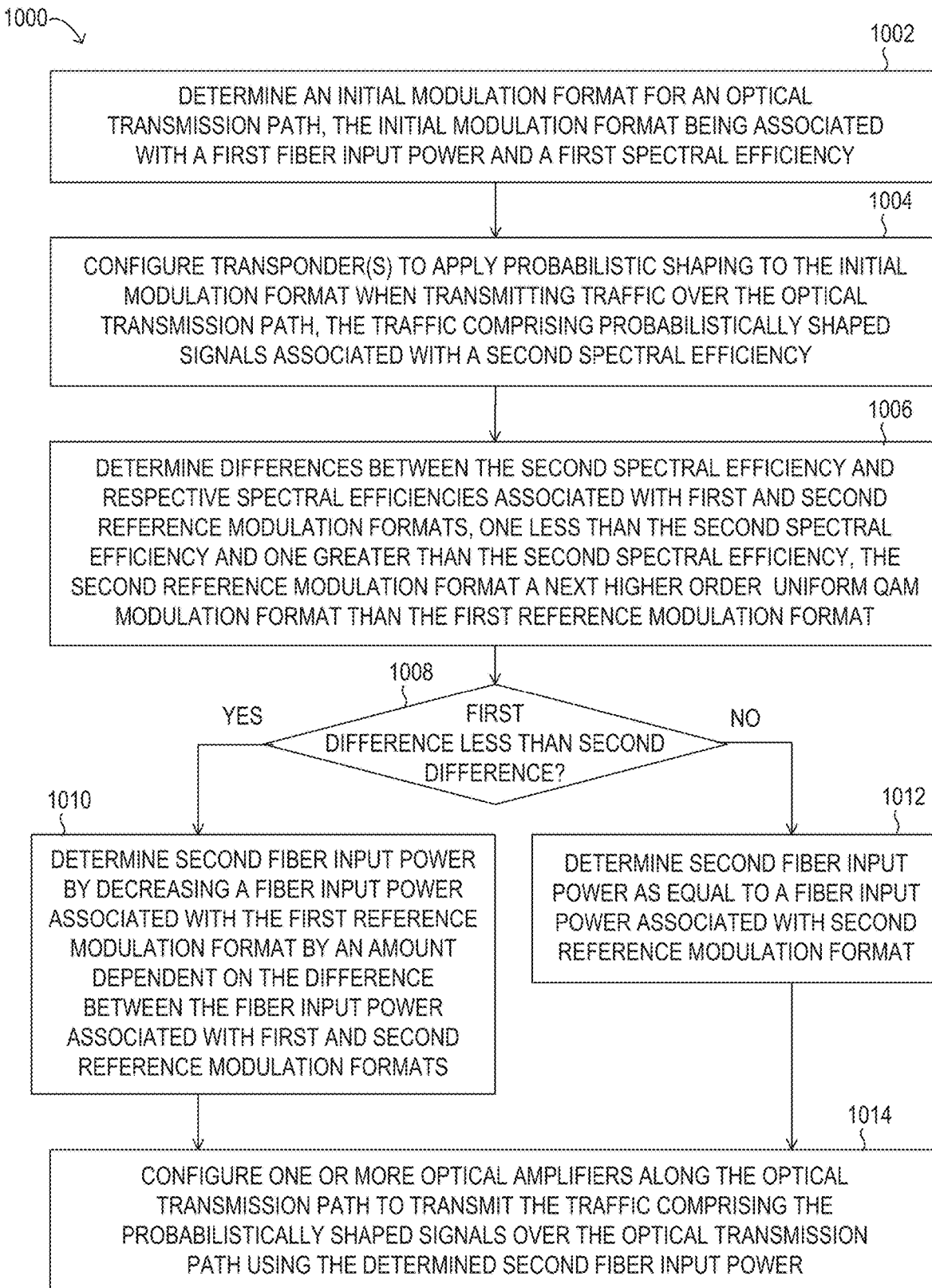
FIG. 10 is a block diagram of selected elements of an embodiment of a method for estimating optimum fiber input power for probabilistically shaped signals based on optimum fiber input power for reference modulation formats, depicted in flowchart form.

FIG. 10 is a block diagram of selected elements of an embodiment of a method 1000 for estimating optimum fiber input power for probabilistically shaped signals based on optimum fiber input power for reference modulation formats, depicted in flowchart form. Method 1000 may be performed using optical transport network 101. In some embodiments, network management system 400 illustrated in FIG. 4 may be configured to estimate fiber input power for probabilistically shaped signals as well as send commands to optical transponders and/or amplifiers to configure them to apply the estimated optimum fiber input power, as described herein. Although method 1000 is described in the singular in terms of an optical transmission path among a plurality of optical transmission paths, it will be understood that operations in method 1000 may be repeated or duplicated, either in parallel or serially, for any plurality of optical transmission paths. It is noted that certain operations described in method 1000 may be optional or may be rearranged in different embodiments.

Method 1000 may begin at 1002 by determining an initial modulation format for an optical transmission path, the initial modulation format being associated with a first fiber input power and a first spectral efficiency. In at least some embodiments, the initial modulation format may represent a uniform distribution QAM modulation format selected from among a plurality of QAM modulation formats supported in the optical transport network.

Method 1000 may include, at 1004, configuring one or more transponder(s) to apply probabilistic shaping to the initial modulation format when transmitting traffic over the optical transmission path, the traffic comprising probabilistically shaped signals associated with a second spectral efficiency.

At 1006, the method may include determining differences between the second spectral efficiency and respective spectral efficiencies associated with first and second reference modulation formats, one less than the second spectral efficiency and one greater than the second spectral efficiency, the second reference modulation format a next higher order uniform QAM modulation format than the first reference modulation format.

If, at 1008, the difference between the second spectral efficiency and the spectral efficiency associated with the first reference modulation format is less than the difference between the second spectral efficiency and the spectral efficiency associated with the second reference modulation format, method 1000 may continue at 1010. Otherwise, the method may proceed to 1012.

At 1010, method 1000 may include determining a second fiber input power by decreasing an optimum fiber input power associated with the first reference modulation format by an amount dependent on the difference between optimum fiber input power values associated with the first and second reference modulation formats.

Alternatively, at 1012, method 1000 may include determining a second fiber input power as being equal to the optimum fiber input power associated with the second reference modulation format.

Method 1000 may include, at 1014, configuring one or more optical amplifiers along the optical transmission path to transmit the traffic comprising the probabilistically shaped signals over the optical transmission path using the determined second fiber input power.

Note that, in some embodiments, the spans along an optical transmission path may be of different lengths and may have different fiber nonlinearity characteristics. Similarly, the amplifiers along an optical transmission path may have different gain or noise characteristics. Because fiber nonlinearity accumulates with distance, it may be prohibitively complex and time-consuming to perform the multidimensional calculations needed to determine the optimum fiber input power in these cases. For example, the optimum fiber input power will be different depending on the fiber characteristics of each span and on the relative positions of spans with higher and lower fiber nonlinearity coefficients within the optical transmission path.

Figure 11A:
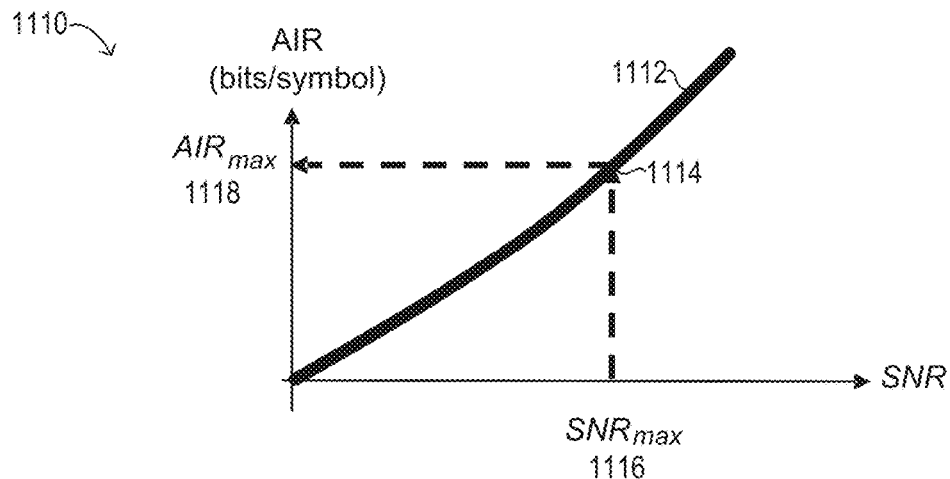
FIG. 11A is a graph illustrating a relationship between achievable information rate and SNR, according to some embodiments.

FIG. 11A is a graph 1110 illustrating a relationship between achievable information rate (AIR) and SNR, according to some embodiments. More specifically, graph 1110 illustrates a mapping between AIR and SNR along line 1112. The point on line 1112 corresponding to the maximum SNR 1116 is shown as 1114. This point corresponds to a maximum AIR shown as 1118.

Figure 11B:
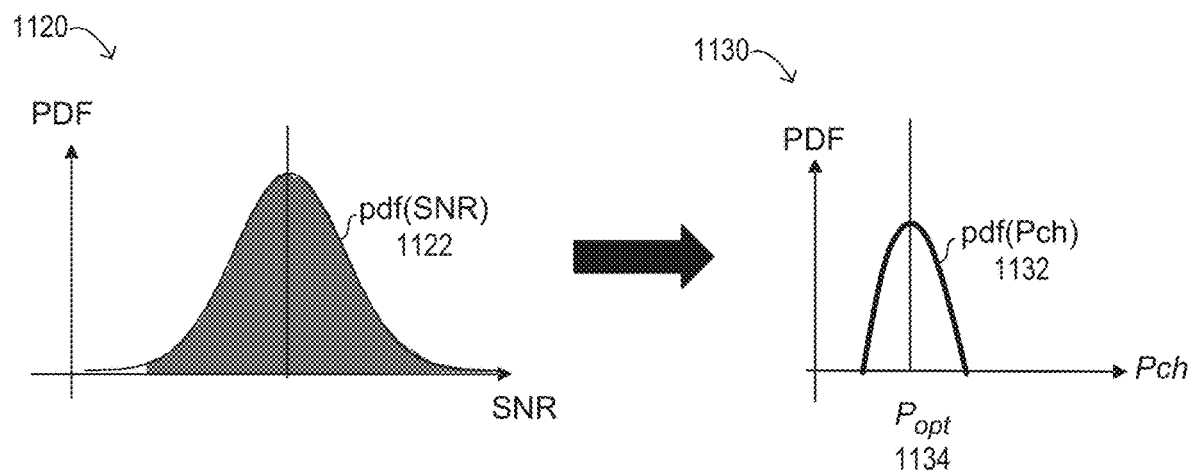
FIG. 11B includes two graphs illustrating a relationship between a probability distribution of SNR and a probability distribution of fiber input power, according to some embodiments.

FIG. 11B includes two graphs illustrating a relationship between a probability distribution of SNR and a probability distribution of fiber input power, according to some embodiments. More specifically, graph 1120 illustrates a distribution function 1122 for SNR and graph 1130 illustrates a probability distribution function 1132 for fiber input power for a given channel. As described herein, the optimum fiber input power may be calculated dependent on measured SNR. In the illustrated example, the optimum fiber input power is shown at 1134.

In some embodiments, rather than estimating optimum fiber input power for probabilistically shaped signals based on optimum fiber input power for reference modulation formats, an optical transport network may implement adaptive selection of fiber input power for probabilistically shaped signals. This approach may be well suited for use in flexible and adaptive networks in which the fiber input power may be finely tuned to yield low OSNR margins and increased transmission reach. In at least some embodiments, the adaptive selection process may include calculating the optimum fiber input power for an initial modulation format (e.g., a reference QAM modulation format with uniform distribution) using a Gaussian noise (GN) model, according to the equation below:

$$SNR = \frac{P_{ch}}{P_{ASE} + P_{NLI}} = \frac{P_{ch}}{P_{ASE} + \eta_{NLI} \cdot P_{ch}^3}$$

As shown in this formula, SNR is equal to the power of the channel, which is the fiber input power, divided by the power of the amplified spontaneous emission (ΔSE) noise plus the power of the nonlinear effect. The power of the ΔSE noise may be calculated based on knowledge of parameters of the link amplifiers (i.e., the gain and noise figures), and the power of the nonlinear effect may be proportional to a nonlinear interference coefficient associated with the fiber and the cube of the power of the channel. In some embodiments, the nonlinear interference coefficient may be calculated based on the link configuration. Thus, all of the terms needed to estimate the optimum fiber input power per channel at the maximum SNR are knowable. The adaptive selection process may also include selecting the largest achievable information rate and a corresponding shaping factor, thus determining the optimum entropy for the probabilistically shaped signals, and then determining a modified fiber input power (e.g., an optimum or estimated optimum fiber input power) for the probabilistically shaped signals.

Figure 12:
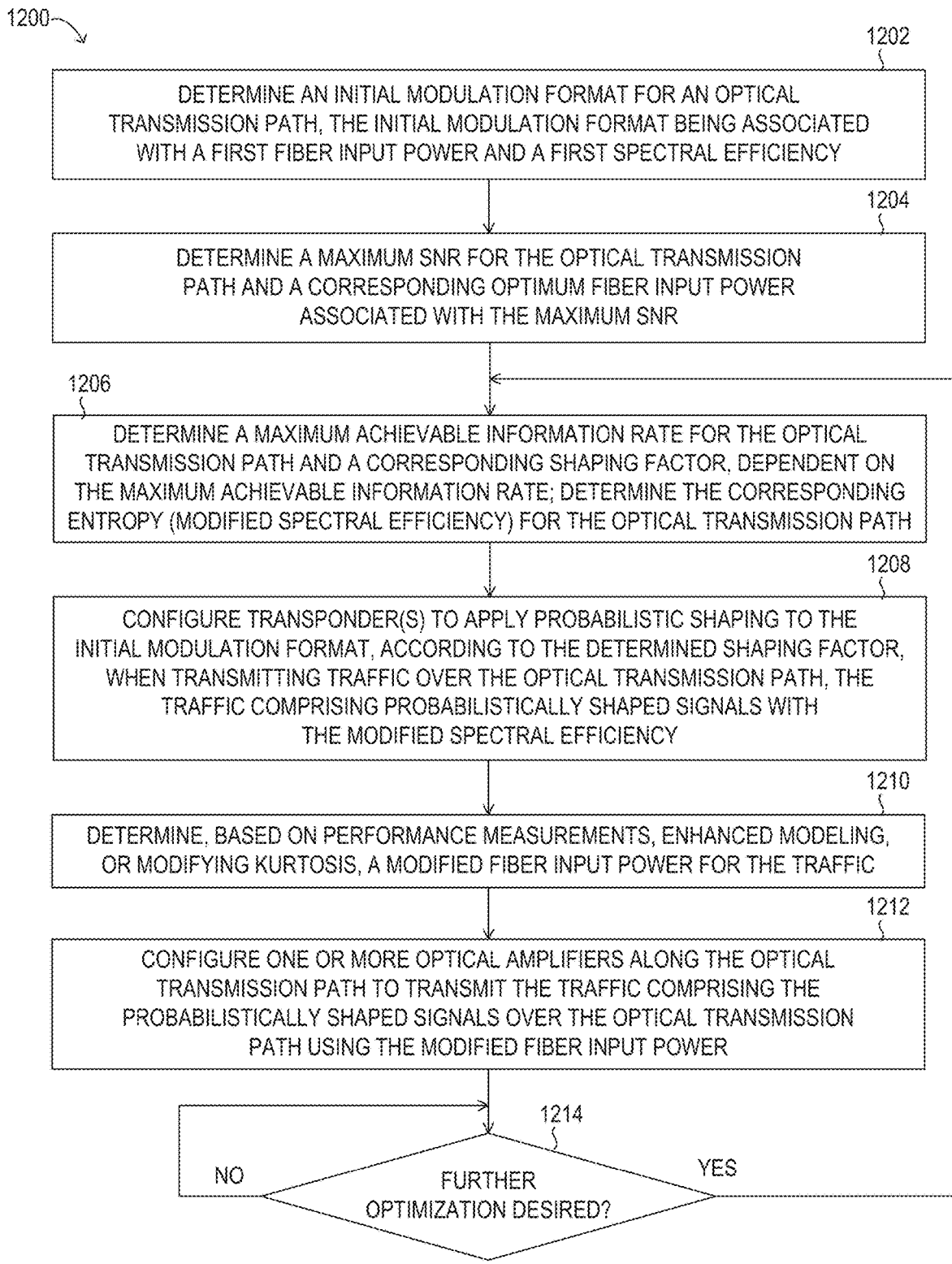
FIG. 12 is a block diagram of selected elements of an embodiment of a method for adaptive selection of fiber input power for probabilistically shaped signals, depicted in flowchart form.

FIG. 12 is a block diagram of selected elements of an embodiment of a method 1200 for adaptive selection of fiber input power for probabilistically shaped signals, depicted in flowchart form. Method 1200 may be performed using optical transport network 101. In some embodiments, network management system 400 illustrated in FIG. 4 may be configured for adaptive selection of fiber input power for probabilistically shaped signals as well as for sending commands to optical transponders and/or amplifiers to configure them to apply the selected fiber input power, as described herein. Although method 1200 is described in the singular in terms of an optical transmission path among a plurality of optical transmission paths, it will be understood that operations in method 1200 may be repeated or duplicated, either in parallel or serially, for any plurality of optical transmission paths. It is noted that certain operations described in method 1200 may be optional or may be rearranged in different embodiments.

Method 1200 may begin at 1202 by determining an initial modulation format for an optical transmission path, the initial modulation format being associated with a first fiber input power and a first spectral efficiency. In at least some embodiments, the initial modulation format may represent a uniform distribution QAM modulation format selected from among a plurality of QAM modulation formats supported in the optical transport network as a base modulation formation for the selection of the fiber input power.

At 1204, the method may include determining a maximum SNR for the optical transmission path and a corresponding optimum fiber input power associated with the maximum SNR. The relationship between fiber input power and signal quality is shown in FIG. 1B and described above. For the specific optical transmission path, a GN model, such as that described above, may be used to calculate $P_{opt}$ at the maximum SNR. Note that there is a known relationship between SNR and OSNR.

Method 1200 may include, at 1206, determining a maximum achievable information rate for the optical transmission path and a corresponding shaping factor, dependent on the maximum achievable information rate (AIR), and determining the corresponding entropy (or modified spectral efficiency) for the probabilistically shaped signal on the optical transmission path. For example, FIG. 11A illustrates the relationship between SNR and achievable information rate, and the optimum entropy, $H(X)_{opt}$ can be computed from the maximum AIR, based on the following equation in which r represents the FEC code rate and m represents the order of the modulation format:

$$AIR = H(X) - (1-r)*m \text{(bits/symbol)}$$

At 1208, the method may include configuring one or more transponder(s) to apply probabilistic shaping to the initial modulation format, according to the determined shaping factor, when transmitting traffic over the optical transmission path, the traffic comprising probabilistically shaped signals with the modified spectral efficiency.

At 1210, method 1200 may include determining a modified fiber input power for the traffic based on performance measurements, on enhanced GN modeling, or on a modification of the probabilistic shaping distribution. For example, in one embodiment, the probabilistically shaped signal may be transmitted on the optical transmission path and the actual SNR measured to determine whether applicable margins are met. If there is unused margin, a new higher value for the optimum fiber input power may be calculated, in accordance with the relationship between the probability distributions of SNR and fiber input power shown in FIG. 1B, in order to make use of that unused margin. In another embodiment, such as in an embodiment in which it is not possible or practical to measure SNR, a more precise enhanced Gaussian noise (EGN) model may be used to more accurately estimate the optimum fiber input power. In yet another embodiment, the kurtosis of the probabilistic shaping distribution, which is measure of the weight of the distribution tails, may be modified to enable improved tolerance to fiber nonlinearity. This, in turn, may support an increase the optimum fiber input power. For example, a shaping distribution with relatively long tails corresponds to weaker shaping, while a shaping distribution with relatively short tails corresponds to stronger shaping. Adjusting the distribution tails to be longer or shorter can impact fiber nonlinearity which, in turn, impacts the optimum fiber input power.

The method may include, at 1212, configuring one or more optical amplifiers along the optical transmission path to transmit the traffic comprising the probabilistically shaped signals over the optical transmission path using the modified fiber input power.

If, at 1214, further optimization of the fiber input power is desired, the method may return to 1206, after which the operations shown as 1206 through 1212 may be repeated, as appropriate, one or more times to dynamically adapt the fiber input power over time or in response to changing conditions in the optical transport network. For example, after modifying the fiber input power at 1212, the resulting received OSNR may be measured or calculated using an EGN model. A new value for the maximum AIR may be calculated from the OSNR and from that, a new entropy and/or fiber input power may be computed. In at least some embodiment, this adaptive selection method for fiber input power may facilitate fine tuning of the entropy of probabilistically shaped signals to achieve the maximum fiber input power and maximum OSNR for transmission at multiple distances.

In at least some embodiments, the systems and methods described herein may be used to manage and optimize fiber input power in optical transmission networks that employ constellation shaping. They may also facilitate the fine tuning of the constellation shaping to obtain improved performance in terms of received OSNR or reach.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method for setting fiber input power in an optical transport network, comprising:

determining, dependent on a target distance for an optical transmission path in the optical transport network, an initial modulation format for the optical transmission path, the initial modulation format representing a uniform distribution quadrature amplitude modulation (QAM) format selected from among a plurality of QAM modulation formats supported in the optical transport network, the initial modulation format being associated with a first fiber input power and a first spectral efficiency;

configuring one or more optical transponders to apply probabilistic shaping to the initial modulation format when transmitting traffic over the optical transmission path, the traffic comprising probabilistically shaped signals associated with a second spectral efficiency;

determining, dependent on the second spectral efficiency, a second fiber input power different from the first fiber input power; and configuring one or more optical amplifiers along the optical transmission path to transmit the traffic comprising the probabilistically shaped signals over the optical transmission path using the second fiber input power.

2. The method of claim 1, wherein the first fiber input power is dependent on one or more of a measure of fiber nonlinearity in the optical transmission path and a link configuration along the optical transmission path.

3. The method of claim 1, wherein determining the second fiber input power comprises:

determining a first difference between the second spectral efficiency and a third spectral efficiency associated with a first reference modulation format, the third spectral efficiency being less than the second spectral efficiency, and the first reference modulation format being a uniform distribution QAM modulation format associated with a third fiber input power;

determining a second difference between the second spectral efficiency and a fourth spectral efficiency associated with a second reference modulation format, the fourth spectral efficiency being greater than the second spectral efficiency, the second reference modulation format being a next higher order uniform distribution QAM modulation format than the first reference modulation format, and the second reference modulation format being associated with a fourth fiber input power;

determining that the first difference is less than the second difference; and in response to determining that the first difference is less than the second difference, determining the second fiber input power by reducing the third fiber input power by an amount dependent on the difference between the third fiber input power and the fourth fiber input power.

4. The method of claim 1, wherein determining the second fiber input power comprises:

determining a first difference between the second spectral efficiency and a third spectral efficiency associated with a first reference modulation format, the third spectral efficiency being less than the second spectral efficiency, and the first reference modulation format being a uniform distribution QAM modulation format associated with a third fiber input power;

determining a second difference between the second spectral efficiency and a fourth spectral efficiency associated with a second reference modulation format, the fourth spectral efficiency being greater than the second spectral efficiency, the second reference modulation format being a next higher order uniform distribution QAM modulation format than the first reference modulation format, and the second reference modulation format being associated with a fourth fiber input power;

determining that the first difference is greater than the second difference; and in response to determining that the first difference is greater than the second difference, setting the second fiber input power to an amount equal to the fourth fiber input power.

5. The method of claim 1, wherein configuring the one or more optical transponders to apply probabilistic shaping to the initial modulation format comprises:

determining, dependent on the initial modulation format, a maximum signal-to-noise ratio (SNR) for the optical transmission path and a corresponding fiber input power associated with the maximum SNR;

determining, dependent on the maximum SNR, a maximum achievable information rate (AIR) and a corresponding shaping factor to be applied to the initial modulation format;

determining an entropy for the probabilistic shaping dependent on the maximum AIR and the corresponding shaping factor, the entropy being indicative of the second spectral efficiency; and configuring the one or more optical transponders to apply probabilistic shaping to the initial modulation format in accordance with the determined entropy.

6. The method of claim 5, wherein determining the second fiber input power comprises:

monitoring SNR performance of the optical transmission path; and calculating the second fiber input power dependent on the monitoring.

7. The method of claim 5, wherein determining the second fiber input power comprises calculating, using an enhanced Gaussian noise model, the second fiber input power dependent on the maximum SNR.

8. The method of claim 5, wherein determining the second fiber input power comprises:

modifying kurtosis of a probability distribution associated with the shaping factor; and adjusting fiber input power dependent on increased tolerance to fiber nonlinearity caused by modifying the probability distribution.

9. The method of claim 5, wherein determining the maximum SNR comprises computing the maximum SNR using an enhanced Gaussian noise model.

10. The method of claim 5, further comprising:

repeating said determining a maximum SNR to determine a modified maximum SNR;

repeating said determining a maximum AIR and a corresponding shaping factor to determine a modified maximum AIR and a modified shaping factor;

repeating said determining an entropy to determine a modified entropy, the modified entropy being indicative of a modified spectral efficiency;

determining a third fiber input power for the probabilistically shaped signals dependent on the modified spectral efficiency; and configuring the one or more optical amplifiers along the optical transmission path to transmit the traffic comprising the probabilistically shaped signals over the optical transmission path using the second fiber input power.

11. The method of claim 1, wherein determining the second fiber input power comprises selecting, dependent on an SNR margin for the optical transport network, a process for determining the second fiber input power from among a plurality of processes for determining the second fiber input power, the plurality of processes including a coarse method for estimating an optimum fiber input power in which an optimum fiber input power for a reference modulation format is incrementally increased or decreased dependent on the second spectral efficiency, and an adaptive process in which selection of the second fiber input power is dependent on measured performance, enhanced Gaussian nose modeling, or modification of a shaping distribution associated with the probabilistically shaped signals.

12. An optical transport network for constellation shaping of quadrature amplitude modulation (QAM) formats, the optical transport network comprising:
    an optical transmission path;
    a plurality of transponders, each operable to apply probabilistic shaping to QAM modulation formats;
    one or more optical amplifiers along the optical transmission path; and
    a network management system configured to:
        determine, dependent on a target distance for the optical transmission path, an initial modulation format for the optical transmission path, the initial modulation format representing a uniform distribution QAM modulation format selected from among a plurality of QAM modulation formats supported in the optical transport network, the initial modulation format being associated with a first fiber input power and a first spectral efficiency;
        configure the one or more optical transponders to apply probabilistic shaping to the initial modulation format when transmitting traffic over the optical transmission path, the traffic comprising probabilistically shaped signals associated with a second spectral efficiency;
        determine, dependent on the second spectral efficiency, a second fiber input power different from the first fiber input power; and
        configure the one or more optical amplifiers along the optical transmission path to transmit the traffic comprising the probabilistically shaped signals over the optical transmission path using the second fiber input power.

13. The optical transport network of claim 12, wherein the first fiber input power is dependent on one or more of a measure of fiber nonlinearity in the optical transmission path and a link configuration along the optical transmission path.

14. The optical transport network of claim 12, wherein to determine the second fiber input power, the network management system is configured to:
    determine a first difference between the second spectral efficiency and a third spectral efficiency associated with a first reference modulation format, the third spectral efficiency being less than the second spectral efficiency, and the first reference modulation format being a uniform distribution QAM modulation format associated with a third fiber input power;
    determine a second difference between the second spectral efficiency and a fourth spectral efficiency associated with a second reference modulation format, the fourth spectral efficiency being greater than the second spectral efficiency, the second reference modulation format being a next higher order uniform distribution QAM modulation format than the first reference modulation format, and the second reference modulation format being associated with a fourth fiber input power;
    determine whether the first difference is less than the second difference;
    in response to a determination that the first difference is less than the second difference, determine the second fiber input power by reducing the third fiber input power by an amount dependent on the difference between the third fiber input power and the fourth fiber input power; and
    in response to a determination that that the first difference is not less than the second difference, set the second fiber input power to an amount equal to the fourth fiber input power.

15. The optical transport network of claim 12, wherein to configure the one or more optical transponders to apply probabilistic shaping to the initial modulation format, the network management system is configured to:
    determine, dependent on the initial modulation format, a maximum signal-to-noise ratio (SNR) for the optical transmission path and a corresponding fiber input power associated with the maximum SNR;
    determine, dependent on the maximum SNR, a maximum achievable information rate (AIR) and a corresponding shaping factor to be applied to the initial modulation format;
    determine an entropy for the probabilistic shaping dependent on the maximum AIR and the corresponding shaping factor, the entropy being indicative of the second spectral efficiency; and
    configure the one or more optical transponders to apply probabilistic shaping to the initial modulation format in accordance with the determined entropy.

16. The optical transport network of claim 15, wherein to determine the second fiber input power, the network management system is configured to:
    monitor SNR performance of the optical transmission path; and
    calculate the second fiber input power dependent on the monitoring.

17. The optical transport network of claim 15, wherein to determine the second fiber input power, the network management system is configured to calculate, using an enhanced Gaussian noise model, the second fiber input power dependent on the maximum SNR.

18. The optical transport network of claim 15, wherein to determine the second fiber input power, the network management system is configured to:
    modify kurtosis of a probability distribution associated with the shaping factor; and
    adjust fiber input power dependent on increased tolerance to fiber nonlinearity caused by modification of the probability distribution.

19. The optical transport network of claim 15, wherein to determine the maximum SNR, the network management system is configured to compute the maximum SNR using an enhanced Gaussian noise model.

20. The optical transport network of claim 15, wherein the network management system is further configured to:
    determine a modified maximum SNR for the optical transmission path;
    determine a modified maximum AIR and a modified shaping factor for the optical transmission path;
    determine a modified entropy for the optical transmission path, the modified entropy being indicative of a modified spectral efficiency for the probabilistically shaped signals;

determine a third fiber input power for the probabilistically shaped signals dependent on the modified spectral efficiency; and configure the one or more optical amplifiers along the optical transmission path to transmit the traffic comprising the probabilistically shaped signals over the optical transmission path using the third fiber input power.

\* \* \* \* \*